(12) United States Patent
Atsumi

(10) Patent No.: US 7,564,577 B2
(45) Date of Patent: Jul. 21, 2009

(54) FAX GATEWAY, FAX MACHINE, AND FAX TRANSMISSION SYSTEM

(75) Inventor: Tomoyuki Atsumi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1203 days.

(21) Appl. No.: 10/794,051

(22) Filed: Mar. 8, 2004

(65) Prior Publication Data

US 2005/0105139 A1    May 19, 2005

(30) Foreign Application Priority Data

Nov. 18, 2003   (JP)   ............................. 2003-388196

(51) Int. Cl.
*G06F 3/12*   (2006.01)
(52) U.S. Cl. ...................... 358/1.15; 358/405; 358/407; 358/426.05
(58) Field of Classification Search ................ 358/1.15, 358/405, 407, 426.05
See application file for complete search history.

(56) References Cited

U.S. PATENT DOCUMENTS

| 7,215,663 | B1 * | 5/2007 | Radulovic | 370/356 |
| 2003/0174366 | A1 * | 9/2003 | Momonami | 358/407 |

FOREIGN PATENT DOCUMENTS

| JP | 2001-251450 | | 9/2001 |
| JP | 2002-217987 | | 8/2002 |
| JP | 2002217987 | * | 8/2002 |
| JP | 2003-259104 | | 9/2003 |

OTHER PUBLICATIONS

Notification of Reasons for Refusal issued in a corresponding Japanese application; and translation thereof.

* cited by examiner

*Primary Examiner*—Twyler L. Haskins
*Assistant Examiner*—Michael Burleson
(74) *Attorney, Agent, or Firm*—Buchanan Ingersoll & Rooney PC

(57) ABSTRACT

A FAX transmission system is composed of: a plurality of first FAX gateways having a function of receiving FAX data from a sending FAX machine over a telephone network and forwarding the FAX data over a communication network other than the telephone network; and a plurality of second FAX gateways having a function of receiving FAX data over the communication network and forwarding the FAX data to a receiving FAX machine over the telephone network. A first FAX gateway in the FAX transmission system acquires, for each second FAX gateway, device information that includes (i) an address on the communication network of the second FAX gateway and (ii) an address on the telephone network of the second FAX gateway or information for acquiring the telephone network address, and transmits the acquired device information to at least one other of the first FAX gateways.

13 Claims, 34 Drawing Sheets

| OFFRAMP NO. | OFFRAMP TELEPHONE NUMBER | NEAREST OFFRAMP |
|---|---|---|
| 0 | 01-123-4567 | 0 |
| 1 | 03-1234-5678 | 1 |
| ⋮ | ⋮ | ⋮ |

| OFFRAMP NO. | OFFRAMP TELEPHONE NUMBER | DOMAIN NAME |
|---|---|---|
| 0 | 03-1234-5678 | tokyo.minolta.co.jp |
| 1 | 045-123-4567 | yokohama.minolta.co.jp |
| ⋮ | ⋮ | ⋮ |

| ONRAMP NO. | ONRAMP ADDRESS |
|---|---|
| 0 | fax@oosaka.minolta.co.jp |
| 1 | fax@kyoto.minolta.co.jp |
| ⋮ | ⋮ |

| SENDER NO. | SENDER TELEPHONE NUMBER |
|---|---|
| 0 | 06—1234—5678 |
| 1 | 075—123—4567 |
| ⋮ | ⋮ |

|  | | SENDER NO. | | | |
|---|---|---|---|---|---|
|  | | 0 | 1 | ... | N |
| OFFRAMP NO. | 0 | 1 | 1 | ... | 0 |
| | 1 | 0 | 0 | ... | 0 |
| | ⋮ | ⋮ | ⋮ | ⋮ | ⋮ |
| | M | 0 | 0 | ... | 0 |

| SENDER | OFFRAMP NO. |
|---|---|
| 0 | 1 |
|  | . . . . . |

FAX GATEWAY, FAX MACHINE, AND FAX TRANSMISSION SYSTEM

This application is based on an application No. 2003-388196 filed in Japan, the contents of which are hereby incorporated by reference.

BACKGROUND OF THE INVENTION (1) Field of the Invention

The present invention relates to a FAX gateway, a FAX machine, and a FAX transmission system.

(2) Description of the Related Art

Recent technology has introduced a new type of internet facsimile gateways (hereinafter referred to as "Internet FAX machines") having onramp and offramp functions. An onramp function is capability of receiving facsimile data (hereinafter, "FAX data") transmitted from a G3 facsimile machine (hereinafter, "FAX machine") over a public telephone network and then forwarding the FAX data to a terminal on the Internet via Internet mail (hereinafter, "mail"). The offramp function is capability of receiving FAX data contained in a mail (i.e. an e-mail message) transmitted over the Internet and then forwarding the FAX data to a receiving FAX machine over the public telephone network. Hereinafter, an Internet FAX machine having an onramp function is referred to as an "onramp", and an Internet FAX machine having an offramp function is referred to as an "offramp".

When an onramp and an offramp are employed as relay (forwarding) stations in FAX transmission from a FAX machine (sending end) to another FAX machine (receiving end) at a remote location, the transmission charge is drastically reduced. This is because in the above FAX transmission, FAX data is transmitted from a sending end sequentially to an onramp, an offramp, and a receiving end. That is to say, the transmission between the onramp and the offramp is carried out over the Internet, which is available under a flat-rate pricing, and transmission over the public telephone network, which is available under usage-based pricing, is carried out over a short distance between the sending end and the onramp as well as between the offramp and the receiving end.

JP unexamined patent application publication 2001-251450, for example, discloses a FAX transmission system via a plurality of relay stations connecting different communication networks that are available under different pricing schemes. This system makes it possible to select an optimum transmission path that keeps the transmission charge to a minimum. In order to make the selection, specifically speaking, the transmission charges for all the possible paths are estimated based on the telephone number area codes of each relay station and of a receiving end, and then a path with the lowest transmission charge is selected.

By employing an onramp and an offramp as the relay stations according to the above technique, a transmission charge for a transmission system with internet FAX machines can be effectively reduced.

With the above system in which an optimum transmission path is selected for a lowest transmission charge, it is desirable that a greater number of onramps and offramps acting as relay stations be located at different locations over a large area. When there are a greater number of relay stations, there are a greater number of selectable transmission paths. Unfortunately, however, in order for performing the transmission and the transmission path selection, it is necessary that each onramp be preliminarily informed of the Internet addresses and telephone numbers of all the offramps.

Conventionally, an administrator of each onramp is obliged to register into the onramp, the Internet addresses and telephone numbers of all the offramps. Consequently, each time an offramp is newly added to the system, the administrator is required to go through a trouble of additionally registering the Internet address and telephone number of the new offramp. Further, there is a need for constantly checking information as to when and where a new offramp is added. This trouble is imposed on each one of the administrators and increases as the number of the offramps increase.

This problem arises also to an administrator of a sending FAX machine. In order to determine whether to perform FAX transmission over a public network or via an onramp and offramp, the sending Fax machine needs to know an offramp closest to a receiving end.

SUMMARY OF THE INVENTION

In view of the above problems, an object of the present invention is to provide a FAX gateway, a FAX machine, and a FAX transmission system each reduces administrators' trouble of registering, when a new FAX gateway is added to the system, an Internet address and other information of the new FAX gateway, than is conventionally required.

To achieve the object stated above, in a FAX transmission system composed of (I) a plurality of FAX gateways having the first function of receiving FAX data from a sending FAX machine over a telephone network and forwarding the FAX data over a communication network other than the telephone network and (II) a plurality of FAX gateways having a second function of receiving FAX data over the communication network and forwarding the FAX data to a receiving FAX machine over the telephone network, the preset invention provides at least one of the FAX gateways having the first function that includes: a device information acquiring unit operable to acquire, for each FAX gateway having the second function, device information that includes (i) an address of the FAX gateway having the second function on the communication network and (ii) an address of the FAX gateway having the second function on the telephone network or information for acquiring the telephone network address; a device information memory; a device information storing unit operable to store the acquired device information to the device information memory; a forwarding unit operable to select one of the FAX gateways having the second function as a forward destination based on the device information, and forward the FAX data to the selected forward destination; and a device information transmitting unit operable to transmit the device information to at least one other of the FAX gateways having the first function.

With the structure stated above, even when a FAX gateway having the second function is newly added to the system, an administrator of each FAX gateway having the first function is saved from the trouble of manually inputting information of the newly added FAX gateway using, for example, the operation panel, and of supplying the information to an administrator of another FAX gateway having the first function.

Alternatively, to achieve the object stated above, in a FAX transmission system composed of (I) a FAX gateway having a first function of receiving FAX data from a sending Fax machine over a telephone network and forwarding the FAX data over a communication network other than the telephone network and (II) a plurality of FAX gateways having a second function of receiving FAX data over the communication network and forwarding the FAX data to a receiving FAX machine over the telephone network, the present invention provides the FAX gateway having the first function that includes: a device information acquiring unit operable to acquire, for each FAX gateway having the second function, device information that includes (i) first information showing an address of the FAX gateway having the second function on the communication network and (ii) second information showing an address of the FAX gateway having the second function on the telephone network or information for acquiring the telephone network address; a device information memory; a device information storing unit operable to store the acquired device information to the device information memory; a forwarding unit operable to select one of the FAX gateways having the second function as a forward destination based on the device information, and forward the FAX data to the selected forward destination; and a transmitting unit operable to transmit the second information to the sending FAX machine.

Alternatively, to achieve the object stated above, in a FAX transmission system composed of (I) a sending FAX machine, (II) a receiving FAX machine, (III) a first FAX gateway having a function of receiving FAX data from the sending FAX machine over a telephone network and forwarding the FAX data over a communication network other than the telephone network, and (IV) a second FAX gateway having a function of receiving FAX data over the communication network and forwarding the FAX data to the receiving FAX machine over the telephone network, the present invention provides the receiving FAX machine that includes: an address information acquiring unit operable to acquire, for each second FAX gateway, an address of the second FAX gate way on the telephone network or information for acquiring the address; an address information memory; an address information storing unit operable to store the acquired address information to the address information memory; and a transmitting unit operable to transmit a signal indicating the address information to the sending FAX machine while FAX transmission with the sending FAX machine is performed over the telephone network.

Alternatively, to achieve the object stated above, in a FAX transmission system composed of (I) a FAX gateway having a first function of receiving FAX data from a sending FAX machine over a telephone network and forwarding the FAX data over a communication network other than the telephone network, and (II) a plurality of FAX gateways having a second function of receiving FAX data over the communication network and forwarding the FAX data to a receiving FAX machine over the telephone network, the present invention provides the FAX gateways having the second function each include a transmitting unit operable to transmit device information to the FAX gateway having the first function, the device information including (i) an address of its own FAX gateway on the communication network and (ii) an address of its own FAX gateway on the telephone network or information for acquiring the telephone network addresses.

Alternatively, to achieve the object stated above, the present invention provides a FAX transmission system that includes: a first and a second FAX gateway each having a function of receiving FAX data from a sending FAX machine over a telephone network and forwarding the FAX data over a communication network other than the telephone network; and a plurality of third FAX gateways having a function of receiving FAX data over the communication network and forwarding the FAX data to a receiving FAX machine over the telephone network. Each of the third FAX gateways includes a first transmitting unit operable to transmit device information to the first FAX gateway, the device information including (i) an address of its own third FAX gateway on the communication network and (ii) an address of its own third FAX gateway on the telephone network or information for acquiring the telephone network addresses. The first FAX gateway includes: first receiving unit operable to receive the device information from the third FAX gateways; a first memory; a first storing unit operable to store the received device information to the first memory; a forwarding unit operable to select one of the third FAX gateways as a forward destination based on the device information, and forward the FAX data to the selected forward destination; and a second transmitting unit operable to transmit the device information to the second FAX gateway. The second FAX gateway includes: a second receiving unit operable to receive the device information from the first FAX gateway; a second memory; and a second storing unit operable to store the received device information to the second memory.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a view illustrating the structure of an offramp information table stored in the FAX machine;

FIG. 6 is a view illustrating the structure of an offramp information table stored in the first MFP;

FIG. 7 is a view illustrating the structure of an onramp information table stored in the first MFP;

FIG. 8 is a view illustrating the structure of a sender information table stored in the first MFP;

FIG. 9 is a view illustrating the structure of an offramp information transmission log table stored in the first MFP;

FIG. 10 is a view illustrating the structure of an offramp information transmission request table stored in the first MFP;

DESCRIPTION OF THE PREFERRED EMBODIMENT

Reference is made to the accompany drawings to describe a FAX gateway, a FAX machine, and a FAX transmission system according to a preferred embodiment of the present invention.

I. Structure of Fax Transmission System

Figure 1:
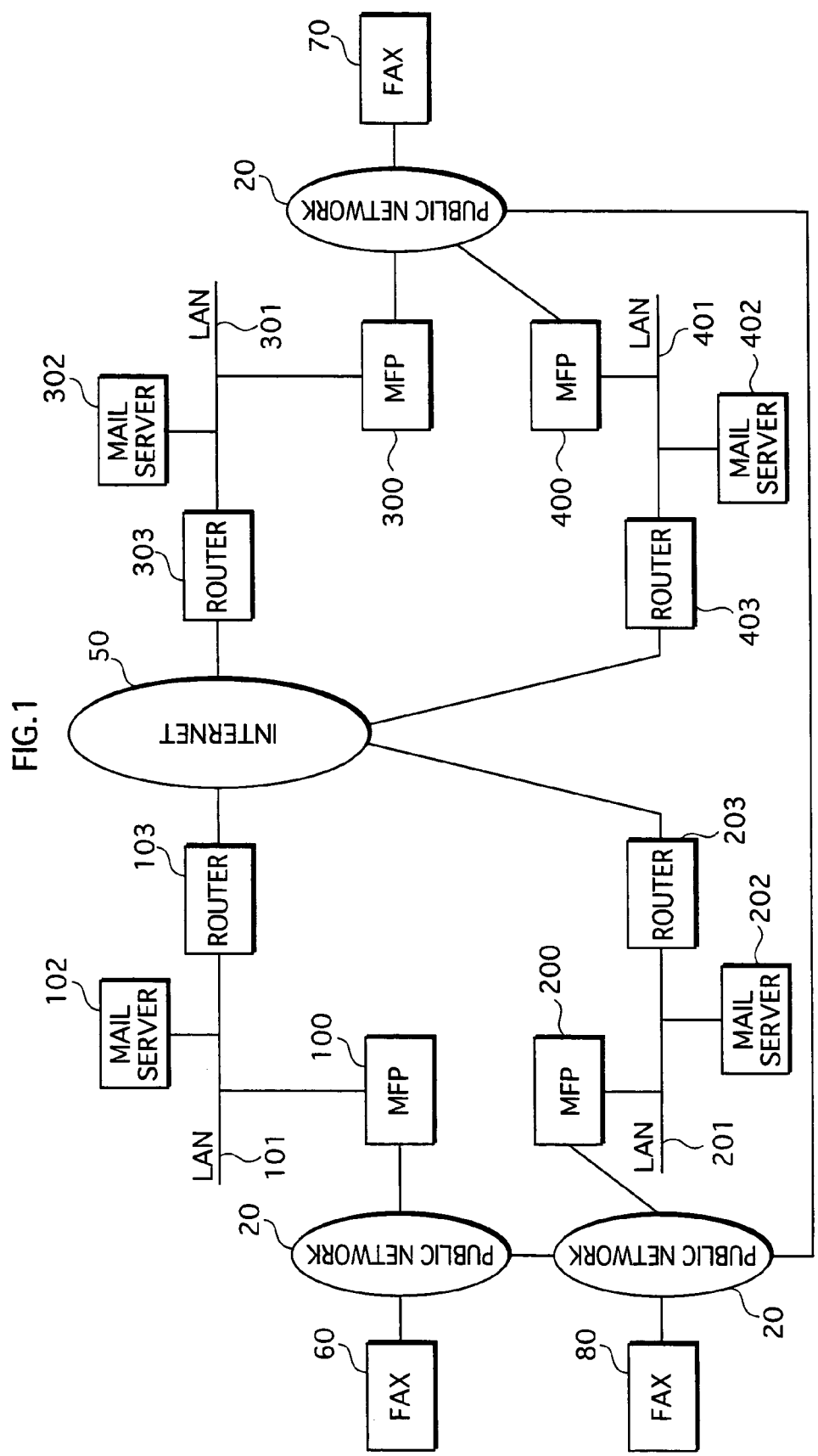
FIG. 1 is a view illustrating one example of the structure of a FAX transmission system.

FIG. 1 is a view illustrating one example of the structure of a FAX transmission system 1 (hereinafter, referred to simply as the "system").

As illustrated in the figure, the system 1 is composed of FAX machines 60, 70, and 80, and multiple function peripherals (hereinafter, referred to as "MFPs") 100, 200, 300, and 400. The FAX machines 60-80 and the MFPs 100-400 are mutually connected via a public telephone network (hereinafter, referred to as the "public network") 20. In addition, the MFPs 100-400 are mutually connected via LANs (Local Area Networks) 101, 201, 301, or 401 and the Internet 50.

The FAX machines 60-80 are capable of FAX transmission/reception over the public network 20 using the control procedures for Group 3 (hereinafter, "G3") FAX transmission. Further, the FAX machines 60-80 are also capable of transmission/reception of a predetermined password with a device at the other end of transmission using the FAX transmission procedure signals (hereinafter, referred to as "F-code") as defined by the ITU-T recommendation.

The MFPs 100-400 have a FAX transmission/reception function in addition to a scan function of scanning an image to obtain image data, and a copy function of printing out scanned image data on paper. Further, the MFPs 100-400 are capable of data transmission with one another over the LANs 101-401 and the Internet 50 using, in this embodiment, TCP/IP (Transmission Control Protocol/Internet Protocol), and have a mail transmission/reception function via mail servers 102, 202, 302, and 402 as well as routers 103, 203, 303, and 403 each connected to one of the LANs 101-401.

The MFPs 100 and 200 have an onramp function of receiving FAX data from a FAX machine (a sending end) over the public network 20 using the FAX transmission control procedures, and forwarding the received FAX data to the Internet 50 by mail.

On the other hand, the MFPs 300 and 400 have an offramp function of receiving FAX data contained in a mail transmitted over the Internet 50, and forwarding the received FAX data to a FAX machine (receiving end) over the public network 20 using the FAX transmission control procedures. Thus, each of the MFPs 100-400 acts also as a FAX gateway.

In this embodiment, the FAX machines 60, 70, and 80 are at remote locations, while the MFP 100 is located relatively close to the FAX machine 60 and the MFP 200 is located relatively close to the FAX machine 80. The FAX machine 60 uses the MFP 100 as an onramp, and the FAX machine 80 uses the MFP 200 as an onramp.

Note that although the figure illustrates the MFPs 100 and 200 as onramps and the MFPs 300 and 400 as offramps, it is naturally appreciated that the number of onramps and offramps are not limited to this specific example illustrated, and any combination of one or more onramps and one or more offramps may be possible. Hereinafter, the MFPs 100 and 200 may also be referred to as "onramps" and the MFPs 300 and 400 may also be referred to as "offramps".

Now, a brief description is given to processing performed by the system 1.

(1) Processing Performed When New Offramp (e.g. MFP 400) is Added (1-1) Processing Performed by MFP 400

The MFP 400 transmits device information (hereinafter, referred to as "offramp information") by mail to one of the onramps (for example, the MFP 100). The offramp information of the MFP 400 includes its telephone number serving as an address on the telephone network and domain name serving as an address on a communication network (the Internet 50, in this case) other than the telephone network (Note that a "telephone number" of an MFP or a FAX machine used in this specification is synonymous with a "FAX number", as generally referred to). Hereinafter, a mail transmitted from an offramp to an onramp for supplying offramp information is referred to as an "offramp information mail F".

(1-2) Processing Performed by MFP 100

The MFP 100 stores therein the received offramp information and transmits the offramp information to a FAX machine that uses the MFP 100 as an onramp (the FAX machine 60, in this case). Further, the MFP 100 sends the offramp information by mail to one or more onramps (the MFP 200, in this case). Hereinafter, a mail transmitted from an onramp to another onramp for supplying offramp information is referred to as an "offramp information mail N".

(1-3) Processing Performed by MFP 200

The MFP 200 stores therein the received offramp information, and transmits the offramp information to each FAX machine that uses the MFP 200 as an onramp (the FAX machine 80, in this case). Further, if there is yet another onramp, the MFP 200 transmits the offramp information by an offramp information mail N to the other onramp.

(1-4) Processing Performed by FAX Machines 60 and 80

Each of the FAX machines 60 and 80 stores the received offramp information.

(2) Processing Performed For FAX Transmission from FAX Machine 60 (Sending End) to FAX Machine 70 (Receiving End)

(2-1) Processing Performed by FAX Machine 60 (Sending End)

The FAX machine 60 selects either (a) transmission over the public network 20 only or (b) transmission via an onramp and an offramp (hereinafter, referred to as "Internet FAX transmission"), whichever is lower in the transmission charge. This transmission path selection is made according to, for example, the technique disclosed in the above publication, using the offramp information stored through the above processing (1-4). When selecting (a), the FAX machine 60 transmits FAX data to the FAX machine 70. When selecting (b), on the other hand, the FAX machine 60 transmits FAX data to the MFP 100.

(2-2) Processing Performed by MFP 100 (Onramp)

On receiving a request from the FAX machine 60 for Internet FAX transmission, the MFP 100 selects either (a) the MFP 300 or (b) the MFP 400 as an offramp via which the FAX data received from the FAX machine 60 is transmitted to the FAX machine 70 with a lower transmission charge. This transmission path selection is made according to, for example, the technique disclosed in the above publication using the offramp information stored through the above processing (1-2). When selecting (a), the MFP 100 transmits a mail containing the received FAX data to the MFP 300. When selecting (b), on the other hand, the MFP 100 transmits such a mail to the MFP 400.

(2-3) Processing Performed by MFPs 300 and 400 (Offramps)

On receiving the mail from the MFP 100, the MFP 300 or 400 transmits the FAX data contained in the received mail to the FAX machine 70 being the receiving end.

As Described above, according to the system 1 of this embodiment, each time a new offramp is added, offramp information of that new offramp is automatically supplied to and stored in each onramp and FAX machine in the system 1. As a result, a FAX machine acting as a sending end and an onramp are allowed to select an appropriate transmission path based on the thus stored offramp information. In addition, administrators of onramps and FAX machines are saved from the trouble of registering the offramp information.

Hereinafter, description is given in detail to the FAX machines 60-80 and the MFPs 100-400 with respect to their structures and processing.

II. Structure of Fax Machine 60

Figure 2:
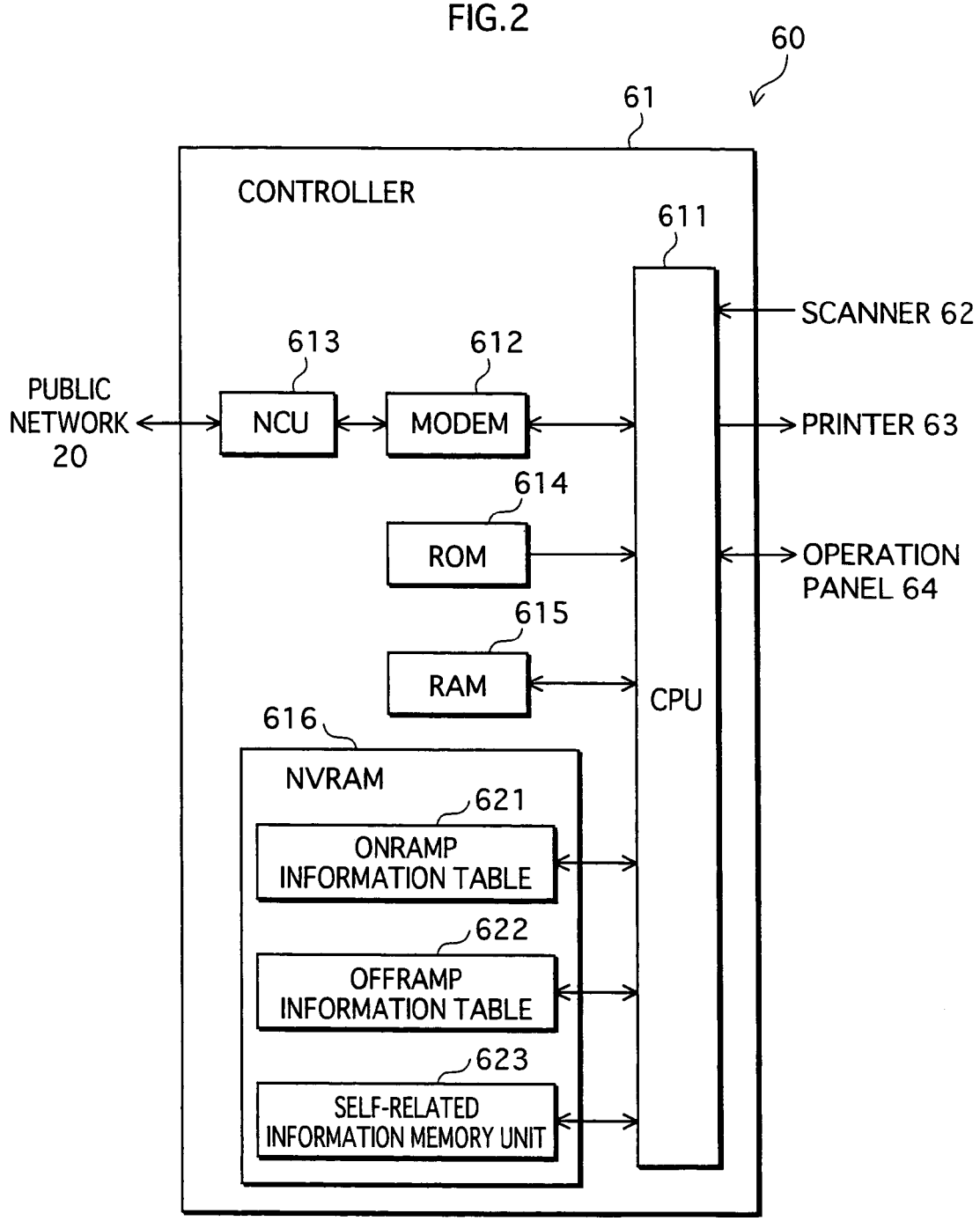
FIG. 2 is a block diagram illustrating the structure of a FAX machine included in the FAX transmission system.

FIG. 2 is a block diagram illustrating the structure of the FAX machine 60.

As illustrated in the figure, the FAX machine 60 is composed mainly of a controller 61, a scanner 62, a printer 63, and an operation panel 64.

The scanner 62 is a conventional one that scans a document to obtain image data of the document.

The printer 63 is a conventional electrophotographic printer that prints out an image based on image data.

The operation panel 64 has, for example, a start key for starting FAX transmission, a ten-key pad for dialing, a key for one-touch dialing, and a liquid crystal display (LCD) provided with a touch panel laminated over a surface thereof.

The LCD is for displaying registered destinations selectable with a one-touch dialing key, a menu screen for destination registration of a telephone number, and so on. Through touch operations, operators can select an appropriate screen to be displayed and enter various information items on the displayed screen.

The controller 61 is provided with a CPU 611, a modem 612, an NCU 613, a ROM 614, a RAM 615, and an NVRAM 616.

The modem 612 modulates and demodulates FAX transmission control signals and image signals. The NCU (Network Controller Unit) 613 is connected to the public network 20, and inputs and outputs incoming calls, and outgoing calls, and analog signals.

The NVRAM 616 is a non-volatile memory, and includes an onramp information table 621, an offramp information table 622, and a self-related information memory unit 623.

The onramp information table 621 stores information showing a telephone number of an onramp (i.e. the MFP 100, in this case) via which Internet FAX transmission is performed. The telephone number is inputted and registered by an operator in advance using the operation panel 64, and read as information showing a destination of FAX transmission at the time of the transmission path selection and the Internet FAX transmission.

The offramp information table 622 stores telephone numbers of devices usable as offramps. Here, the telephone numbers of the MFPs 300 and 400 are stored.

FIG. 3 is a view illustrating the structure of the offramp information table 622.

As illustrated in the figure, the offramp information table 622 is composed of an offramp number column, a telephone number column, and a nearest offramp column. When a new offramp is added to the system 1, an offramp number identifying the new offramp is written to the offramp number column and the telephone number of the new offramp is written to the offramp telephone number column through the later-described offramp information update processing (steps S434 and S453). The nearest offramp column stores a flag indicating the nearest offramp to the FAX machine 60. An offramp selected as the nearest one is indicated by the flag set to "1" through the later-described nearest offramp information update processing (steps S435 and S454). In the example of FIG. 3, the offramp of which offramp number is "1" is nearest to the FAX machine 60. For all the other offramps, "0" is stored in the nearest offramp column.

Referring back to FIG. 2, the self-related information memory unit 623 stores its own telephone number (the telephone number of the FAX machine 60) inputted by an operator using the operation panel 64.

The ROM 614 stores control programs of the FAX machine 60.

The CPU 611 reads an appropriate control program from the ROM 614 as necessary, and controls overall operations of FAX transmission/reception. To be more specific, in the case of FAX transmission, the CPU 611 first performs the transmission path selection.

For example, the CPU 611 reads the telephone number of the onramp from the onramp information table 621 and a telephone number of each offramp from the offramp information table 622. Based on the read telephone numbers of the onramp, offramps, and of a receiving FAX machine specified by the operator, the CPU 611 estimates transmission charges for the FAX transmission entirely over the public network 20, and for the FAX transmission over the public network 20 between the FAX machine 60 and the onramp as well as between each offramp and the receiving FAX machine and over another communication network such as the Internet 50 between the onramp and the offramp (the transmission over the Internet 50 may be performed at no charge under the flat-rate pricing). The transmission charges are estimated using the technique disclosed in the above publication, for example. Briefly speaking, there is provided in advance a table storing telephone number area codes along with approximate transmission charges between one another. At the time of transmission path selection, a transmission charge between the sending end and the receiving end is read from the table based on their area codes.

Through the transmission path selection, a transmission path with a lowest charge is selected as the optimum one, and the transmission destination is determined accordingly. When the transmission path over the public network is selected, the receiving FAX machine is determined to be the transmission destination. On the other hand, when Internet FAX transmission is selected, the onramp is determined to be the transmission destination.

The CPU 611 then controls the scanner 62 to start scanning a document, encodes the obtained FAX data using a known technique such as MH (Modified Huffman) coding, and then causes the resulting data to be transmitted to the determined transmission destination via the modem 612 and the NCU 613.

When Internet FAX transmission is selected, on establishing connection to the MFP 100 acting as the onramp, the CPU 611 supplies thereto, the telephone number (FAX destination information) of the receiving FAX machine (i.e. the FAX machine 70, in this case) being the final destination of the transmission using a predetermined tone signal.

Referring now to FAX reception, the CPU 611 decodes FAX data received from the sender, and passes the decoded data to the printer 63, so that the printer 63 prints out an image based on the received data. In addition, at the time of FAX transmission/reception, the CPU 611 also performs processing such as the offramp information update processing (step S434). The CPU 611 also receives information regarding key input made to the operation panel 64 and judges, in response, which key is pushed by an operator and controls the LCD to display a destination registration menu and the like.

The RAM 615 is used as a work area by the CPU 611 at the time of executing the control programs.

Note that the other FAX machines 70 and 80 are substantially identical in structure to the FAX machine 60, and thus description thereof is omitted.

III. Structure of MFP 100

Figure 4:
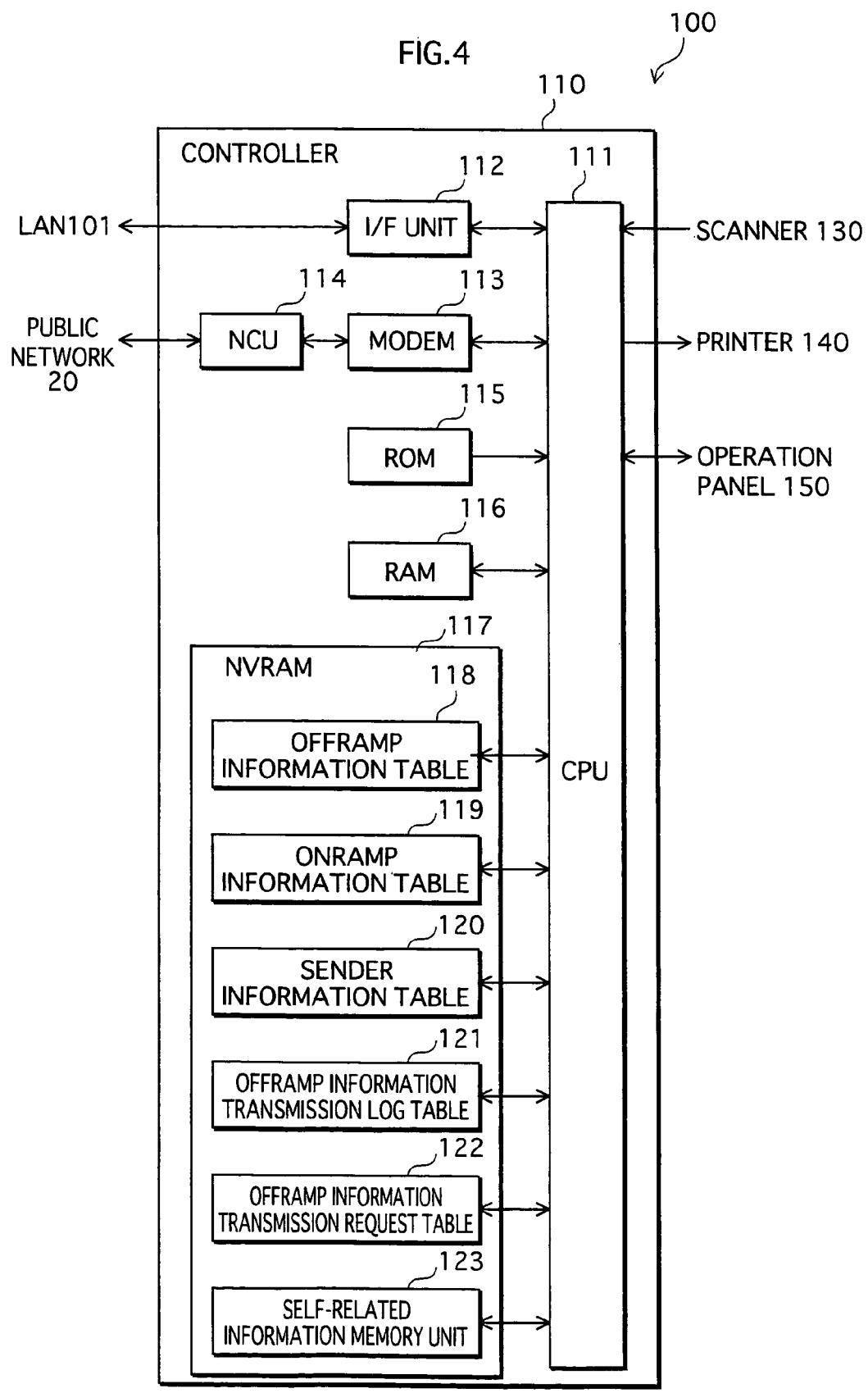
FIG. 4 is a block diagram illustrating the structure of a first MFP included in the FAX transmission system.

FIG. 4 is a block diagram illustrating the structure of the MFP 100.

As illustrated in the figure, the MFP 100 is composed mainly of a controller 110, a scanner 130, a printer 140, and an operation panel 150.

The scanner 130 and the printer 140 are substantially identical to the scanner 62 and the printer 63 described above, respectively.

Figure 5:
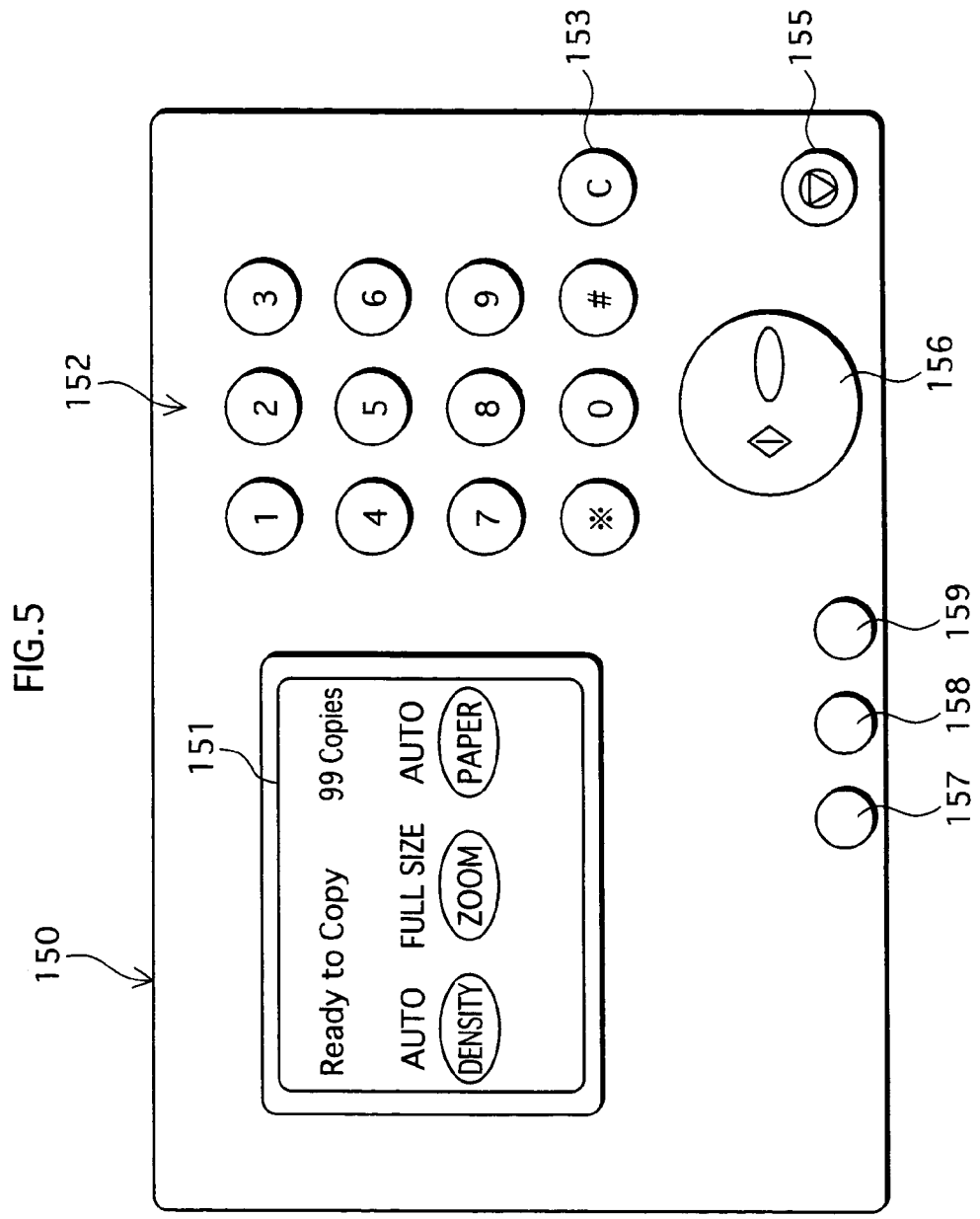
FIG. 5 is a view illustrating an operation panel of the first MFP.

As illustrated in FIG. 5, the operation panel 150 is provided with a display screen 151, a ten-key pad 152, a clear key 153, a stop key 155, a start key 156, an offramp information input mode key 157, an onramp address input mode key 158, and an OK key 159.

The ten-key pad 152 is used by an operator to input the number of copies to be made, a telephone number, and other information. The clear key 153 is used to clear (reset) inputted information such as the number of copies to be made. The stop key 155 is used to stop operations of e.g. copying being performed. The start key 156 is used to start operations of copying, FAX transmission, and so on.

The offramp information input mode key 157 is used to enter the offramp information input mode. The onramp address input mode key 158 is used to enter the onramp address input mode.

The offramp information input mode is for receiving input of offramp information from an operator. The onramp address input mode is for receiving input of an internet address (hereinafter, referred to as an "address") of another onramp from the operator. In these modes, the operator can input offramp information and address of another onramp (hereinafter, information showing the address of an onramp is referred to as "onramp information").

The display screen 151 is an LCD for displaying operator input such as the number of copies to be made and a telephone number, an input receiving screen for each mode such as the onramp address input mode. The display screen 151 also displays an operation state of the MFP 100. Since the display screen 151 is provided with a touch panel laminated over the surface thereof, the operator can input information such as an address by touching appropriate keys and buttons displayed thereon.

Referring back to FIG. 4, the controller 110 is provided with a CPU 111, an I/F unit 112, a modem 113, an NCU 114, a ROM 115, a PAM 116, and an NVRAM 117.

The I/F unit 112 is an interface for establishing connection with the LAN 101 such as an LAN card or an LAN board.

The modem 113 and the NCU 114 are identical in functionality to the modem 612 and the NCU 613 described above, respectively.

The ROM 115 stores control programs of the MFP 100.

The CPU 111 reads an appropriate control program from the ROM 115 as necessary, and controls operations of scanning, copying, FAX transmission/reception, and mail transmission/reception as well as operations performed by the MFP 100 as an onramp. To be more specific, for scanning, the CPU 111 controls the scanner 130 to scan an image of a document. For copying, the CPU 111 passes image data scanned by the scanner 130 to the printer 140, and controls the printer 140 to print out the image data. For FAX transmission/transmission, the CPU 111 operates similarly to the FAX machine 60 described above.

For mail transmission/reception, the CPU 111 first receives an offramp information mail F from an offramp, thereby acquiring offramp information. Subsequently, the CPU 111 transmits an offramp information mail N to other onramps, thereby supplying the offramp information. Also, the CPU 111 receives an offramp information mail N from another onramp, thereby acquiring offramp information.

In addition, as will be described later in detail, the CPU 111 supplies onramp information to another onramp and receives onramp information from another onramp both by way of an onramp information mail.

When the MFP 100 acts as an onramp, the CPU 111 performs communications with a sender via the public network 20, the NCU 114, and the modem 113 using the FAX transmission control procedures to receive FAX data. At the time of the FAX data reception, the CPU 111 receives a tone signal showing FAX destination information (the telephone number of an intended receiver) from the sender, and performs the transmission path selection based on the received telephone number to determine an offramp to which the FAX data is to be forwarded. This transmission path selection is performed in the same manner as the one performed by the FAX machine 60. To be more specific, the CPU 111 estimates transmission charges for transmission between each offramp and the receiver based on their phone numbers, and selects an offramp with the lowest transmission charge as the forward destination. If the thus selected offramp is not available for some reason such as a breakdown, it is applicable that the CPU 111 then selects an offramp with the second lowest transmission charge. That is to say, the CPU 111 performs the transmission path selection so as to select an available transmission path that is the most cost-effective.

Then, the CPU 111 decodes the received FAX data and converts the decoded FAX data to an MIME (Multipurpose Internet Mail Extensions) type file (a TIFF file, for example). To transmit the converted file as a mail attachment, the CPU 111 generates a mail of which "TO:" field contains, as a forward request, the telephone number of the intended receiver, the Atmark "@", and the domain name of the offramp in the stated order, and then transmits the thus generated mail with the attachment over the Internet 50 to the offramp being the forward destination using, for example, the SMTP (Simile Mail Transfer Protocol).

Further, the CPU 111 receives information regarding key input made to the operation panel 150. Upon receipt, the CPU 111 judges that which key is pushed by an operator and controls the display screen 151 to display a menu screen for each mode according to the input.

The RAM 116 is used as a work area by the CPU 111 at the time of performing the control programs.

The NVRAM 117 is a non-volatile memory, and includes an offramp information table 118, an onramp information table 119, a sender information table 120, an offramp information transmission log table 121, an offramp information transmission request table 122, and a self-related information memory unit 123.

FIG. 6 is a view illustrating the structure of the offramp information table 118.

As illustrated in the figure, the offramp information table 118 is composed of an offramp number column, an offramp telephone number column, and a domain name column. When a new offramp is added to the system 1, information of the new offramp is additionally stored to the respective columns of the offramp information table 118 through the input processing (step S210) or the offramp information update processing (step S238) both of which will be described later. The information additionally stored herein includes the offramp number, such as 1 or 2, for identifying the new offramp, the telephone number and domain name of the new offramp (alternatively to the domain name, any address such as an IP address may be used as long as a location on the Internet or the LAN is specified). In this respect, the offramp information table 118 serves as a device information memory for storing offramp information (device information).

Information stored in the offramp information table 118 is read when the MFP 100 supplies offramp information to other onramps and also when the MFP 100 acting as an onramp performs the transmission path selection.

FIG. 7 is a view illustrating the structure of the onramp information table 119.

As illustrated in the figure, the onramp information table 119 is composed of an onramp number column and an onramp address column.

The onramp number column stores a number, such as 1, 2 . . . uniquely assigned as an ID to each device acting as an onramp in the system 1. The address column stores an address of an onramp identified by a corresponding onramp number. The onramp numbers and addresses are stored to through the input processing (step S210) or the onramp information update processing (step S240) both of which will be described later.

Information stored in the onramp information table 119 is read when a new offramp is added to the system 1, and the read information is used as an address of an onramp to which offramp information of the new offramp is to be supplied. In this respect, the onramp information table 119 serves as a recipient information memory storing onramp addresses on the communication network.

FIG. 8 is a view illustrating the structure of the sender information table 120.

As illustrated in the figure, the sender information table 120 is composed of a sender number column and a sender telephone number column.

The sender number column stores a number, such as 1, 2 . . . uniquely assigned as an ID to each FAX machine using the MFP 100 as an onramp (In the example of FIG. 1, the FAX machine 60 is the only such a FAX machine, although there may be a plurality of such FAX machines as in the example illustrated in FIG. 8.) The sender telephone number column stores a telephone number of a FAX machine identified by a corresponding sender number. The sender numbers and telephone numbers are stored through the sender information update processing (step S269), which will be described later. In the example of FIG. 8, the sender number "0" corresponds to the FAX machine 60.

The information stored in the sender information table 120 is read when a new offramp is added to the system 1, and the read information is used as a telephone number of a FAX machine (sender) to which offramp information of the new offramp is to be supplied.

Figure 9:
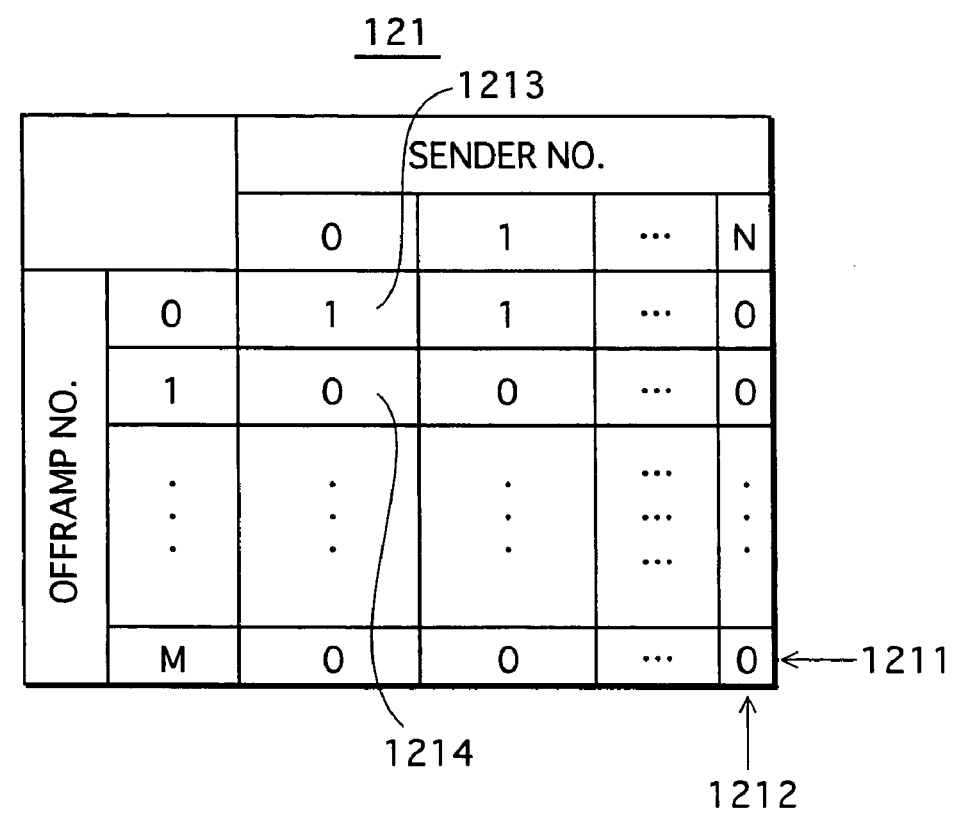

FIG. 9 is a view illustrating the structure of the offramp information transmission log table 121.

As illustrated in the figure, the offramp information transmission log table 121 is composed of offramp number rows and sender number columns.

The numbers (0, 1 . . . ) stored in the offramp number rows correspond to the numbers stored in the offramp number column of the offramp information table 118 illustrated in FIG. 6. The numbers (0, 1 . . . ) stored in the sender number columns correspond to the numbers stored in the sender number column of the sender information table 120 illustrated in FIG. 8. Consequently, when offramp information of a new offramp is additionally stored to the offramp information table 118, a new row corresponding to the offramp number, for example M, assigned to the new offramp is automatically added to the offramp information transmission log table 121. Similarly, when a telephone number of a new sender is additionally stored to the sender information table 120, a new column corresponding to the sender number, for example N, assigned to the new sender is automatically added to the offramp information transmission log table 121. Initially, each column on the newly added row M (1211) all stores "0", and each row in the newly added column N (1212) all stores "0".

The offramp information transmission log table 121 shows, for each offramp, to which senders (FAX machine) its offramp information has or has not been transmitted. For example, regarding the offramp identified by the offramp number "0", its offramp information has been transmitted to the FAX machines identified by the sender numbers "0" and "1", as indicated by "1" stored in corresponding cells. On the other hand, regarding the offramp identified by the offramp number "1", its offramp information has not been transmitted to the FAX machines identified by the sender numbers "0" and "1", as indicated by the value "0" stored in corresponding cells.

The information stored in the offramp information transmission log table 121 is read through the later-described of offramp information transmission request processing (step S251), and updated through the later-described offramp information transmission log update processing (step S255).

Figure 10:
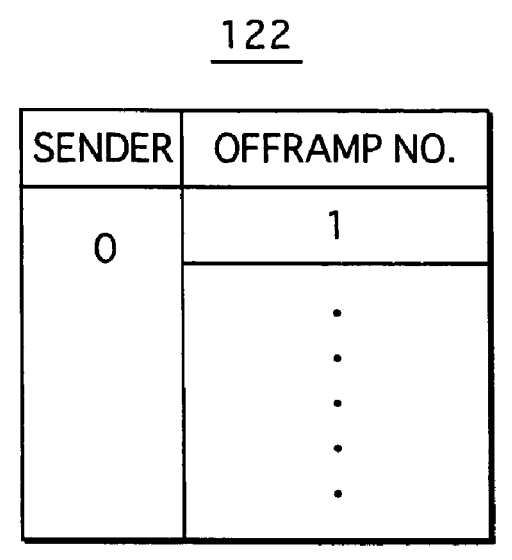

FIG. 10 is a view illustrating the structure of the offramp information transmission request table 122.

As illustrated in the figure, the offramp information transmission request table 122 is composed of a sender number column and an offramp number column.

The sender number column stores a number corresponding to one of the sender numbers stored in the sender number column of the offramp information transmission log table 121 illustrated in FIG. 9. In the example of FIG. 10, the sender number stored is "0". The offramp number column stores numbers corresponding to the offramp numbers stored in the offramp number column of the offramp information transmission log table 121 illustrated in FIG. 9.

The offramp information transmission request table 122 is used at the time of offramp information transmission to the sender (FAX machine) to judge offramp information of which offramp has not been transmitted. The offramp information transmission request table 122 is generated based on information stored in the offramp information transmission log table 121 through the later-described offramp information transmission request processing.

The numbers stored in the offramp number column identifies offramps of which offramp information has not been transmitted. The stored offramp numbers are read in the later-described outgoing call processing (step S253) as a transmission request, so that offramp information of offramps identified by the read offramp numbers are transmitted to the FAX machine identified by the stored sender number.

Referring back to FIG. 4, the self-related information memory unit 123 stores information about the MFP 100, such as the telephone number and address inputted by an operator using the operation panel 150.

Note that the MFP 200 is substantially identical in structure to the MFP 100, so that no description thereof is given.

IV. Structure of MFP 300

Figure 11:
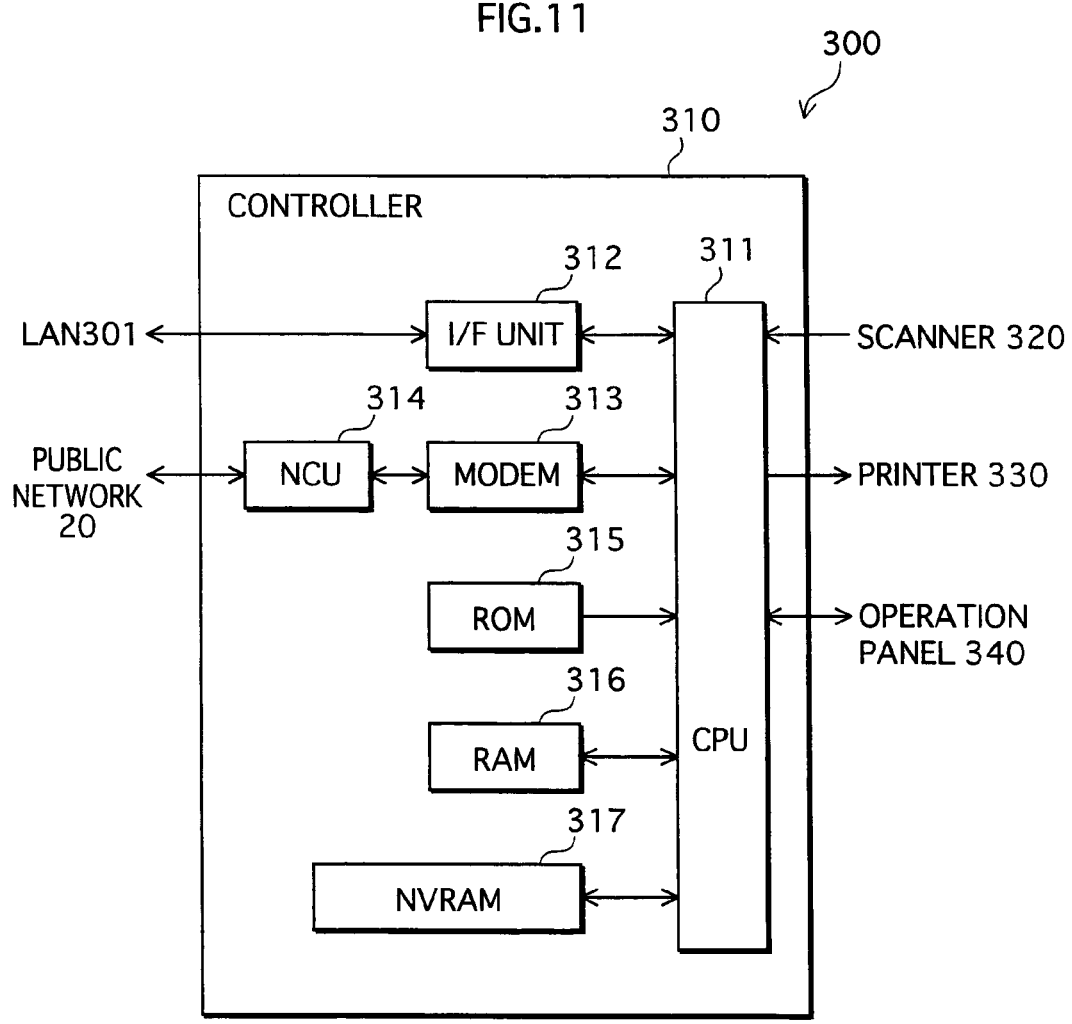
FIG. 11 a block diagram illustrating the structure of a second MFP included in the FAX transmission system.

FIG. 11 is a block diagram illustrating the structure of the MFP 300.

As shown in the figure, the MFP 300 is composed mainly of a controller 310, a scanner 320, a printer 330, and an operation panel 340.

The scanner 320 and the printer 330 are substantially identical to the scanner 62 and the printer 63 described above, respectively.

Figure 12:
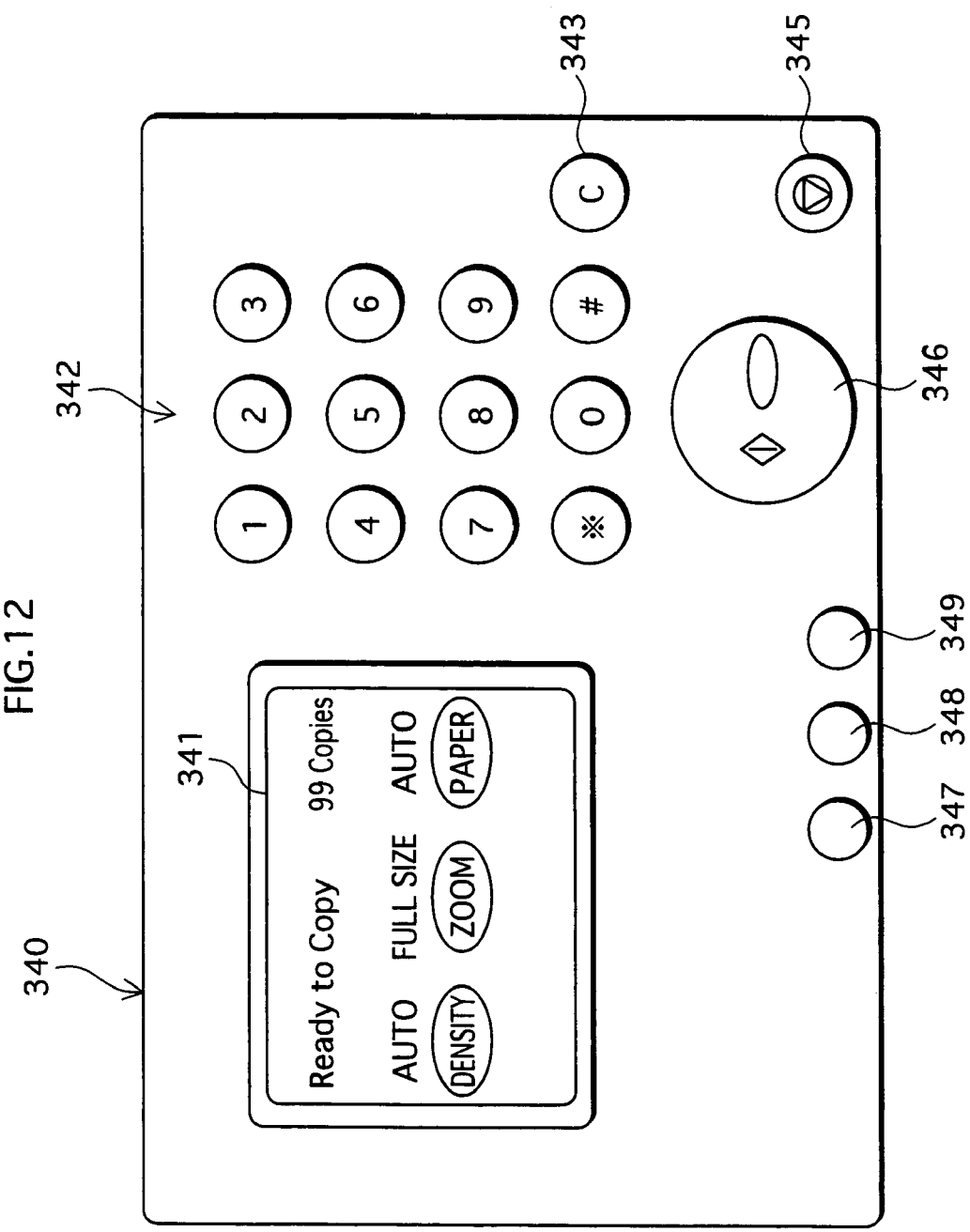
FIG. 12 is a view illustrating an operation panel of the second MFP.

As illustrated in FIG. 12, the operation panel 340 is provided with a display screen 341, a ten-key pad 342, a clear key 343, a stop key 345, a start key 346, a own telephone number input mode key 347, an onramp address input mode key 348, and an OK key 349.

Here, the keys and screen except the own telephone number input mode key 347 are substantially similar in functionality to their counterpart components of the operation panel 150 of the MFP 100.

The own telephone number input mode key 347 is used to enter the own telephone number input mode for receiving operator input of a telephone number of the MFP 300. In this mode, an operator can input the telephone number and domain name of the MFP 300.

Referring back to FIG. 11, the controller 310 is provided with a CPU 311, an I/F unit 312, a modem 313, an NCU 314, a ROM 315, a RAM 316, and an NVRAM 317.

The I/F unit 312, the modem 313, the NCU 314 are substantially identical in functionality to corresponding components of the MFP 100 described above, namely the I/F unit 112, the modem 113, and the NCU 114.

The ROM 315 stores control programs of the MFP 300.

The CPU 311 reads an appropriate control program from the ROM 315 to control operations of scanning, copying, FAX transmission/reception, and mail transmission/reception as well as operations performed by the MFP 300 as an offramp. The operations of scanning, copying, FAX transmission/reception are substantially the same as those described regarding the MFP 100.

For mail transmission/reception, the CPU 311 transmits an offramp information mail F to an onramp.

When the MFP 300 acts as an offramp, the CPU 311 receives a mail with FAX data as a mail attachment from an onramp (an MFP 100 or 200, in this case) over the Internet 50 and the LAN 301 using, for example, SMTP. Subsequently, the CPU 311 extracts the FAX data and FAX destination information (i.e. the telephone number of the FAX machine 70) from the received attachment, encodes the extracted FAX data, transmits the encoded FAX data to the intended receiver (i.e. the FAX machine 70) using the FAX transmission control procedures.

Further, the CPU 311 receives information regarding key input made to the operation panel 340. Upon receipt, the CPU 311 judges that which key is pushed by an operator and controls the display screen 341 to display menu screen for each mode according to the input.

The RAM 316 is used as a work area by the CPU 311 at the time of performing the control programs.

The NVRAM 317 is a non-volatile memory, and stores information regarding the MFP 300, such as its own the telephone number and address inputted by an operator, and also stores an address of one onramp.

Note that the MFP 400 is substantially identical in structure to the MFP 300, and thus description thereof is omitted.

V. Processing Performed by Offramps (MRPs 300 and 400)

Figure 13:
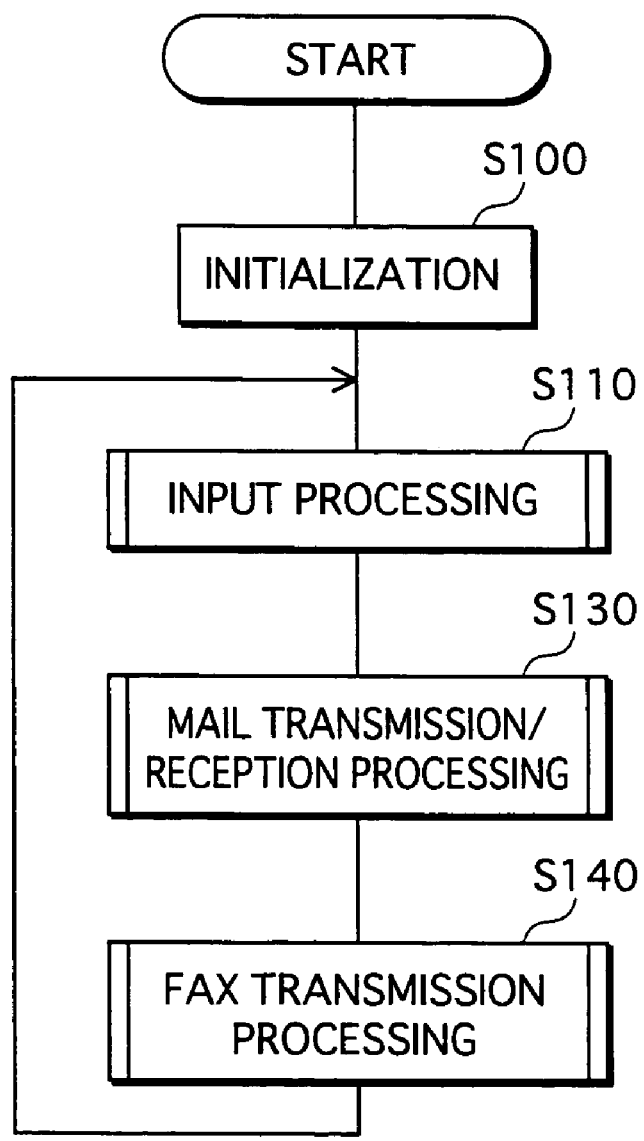
FIG. 13 is a flowchart illustrating a main routine of processing performed by a controller of the second MFP.

FIG. 13 is a flowchart illustrating a main routine of the processing performed by an offramp, specifically by the controller 310 of the MFP 300.

As illustrated in the figure, the controller 310 first performs initialization (step S100). Through the initialization, the RAM 316 is cleared, registers are set, and flags are reset.

After the initialization, input processing (step S110), mail transmission/reception processing (step S130), and FAX transmission processing (step S140) are sequentially performed.

Figure 14:
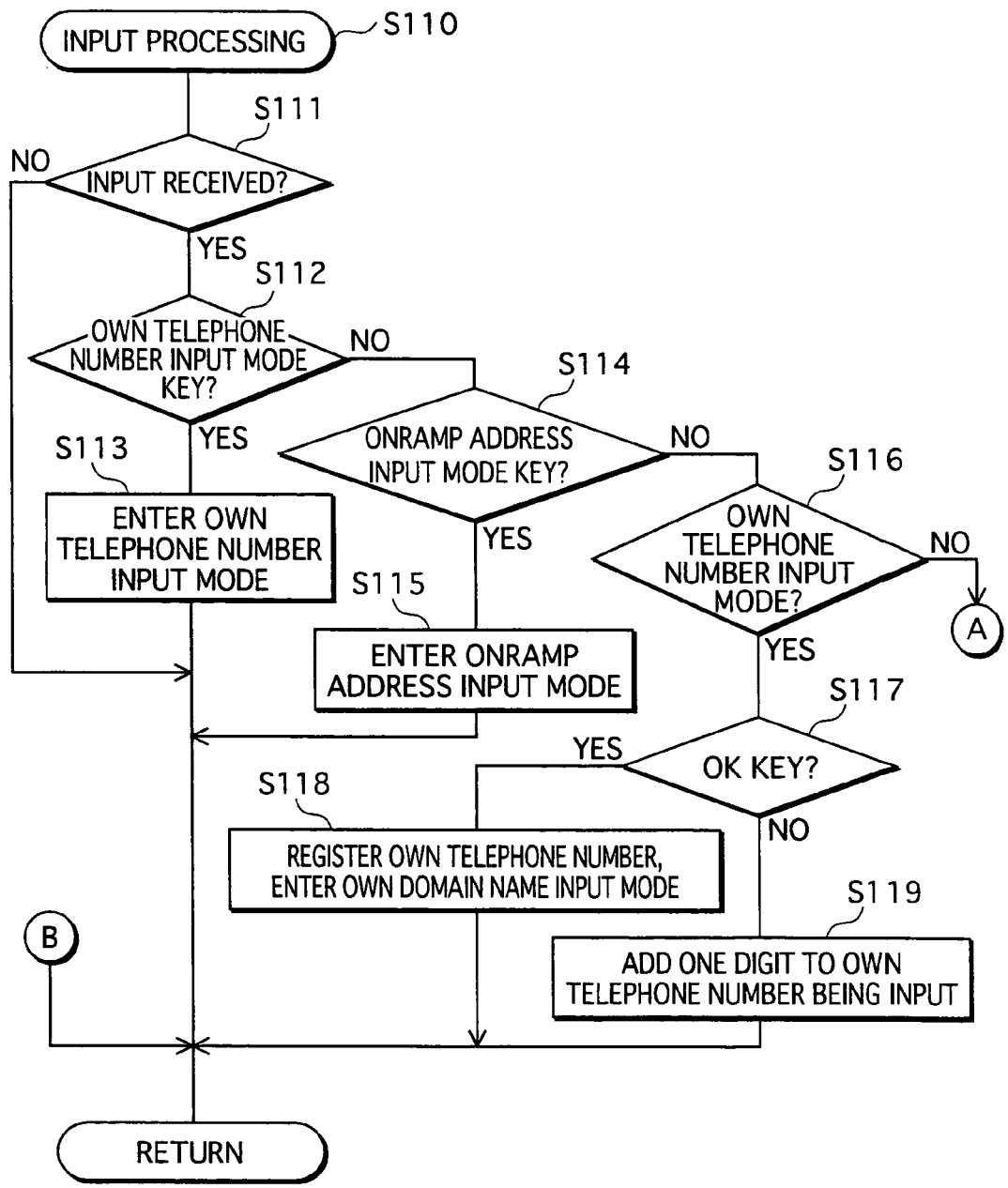
FIG. 14 is a flowchart illustrating a subroutine for input processing performed by the controller.
Figure 15:
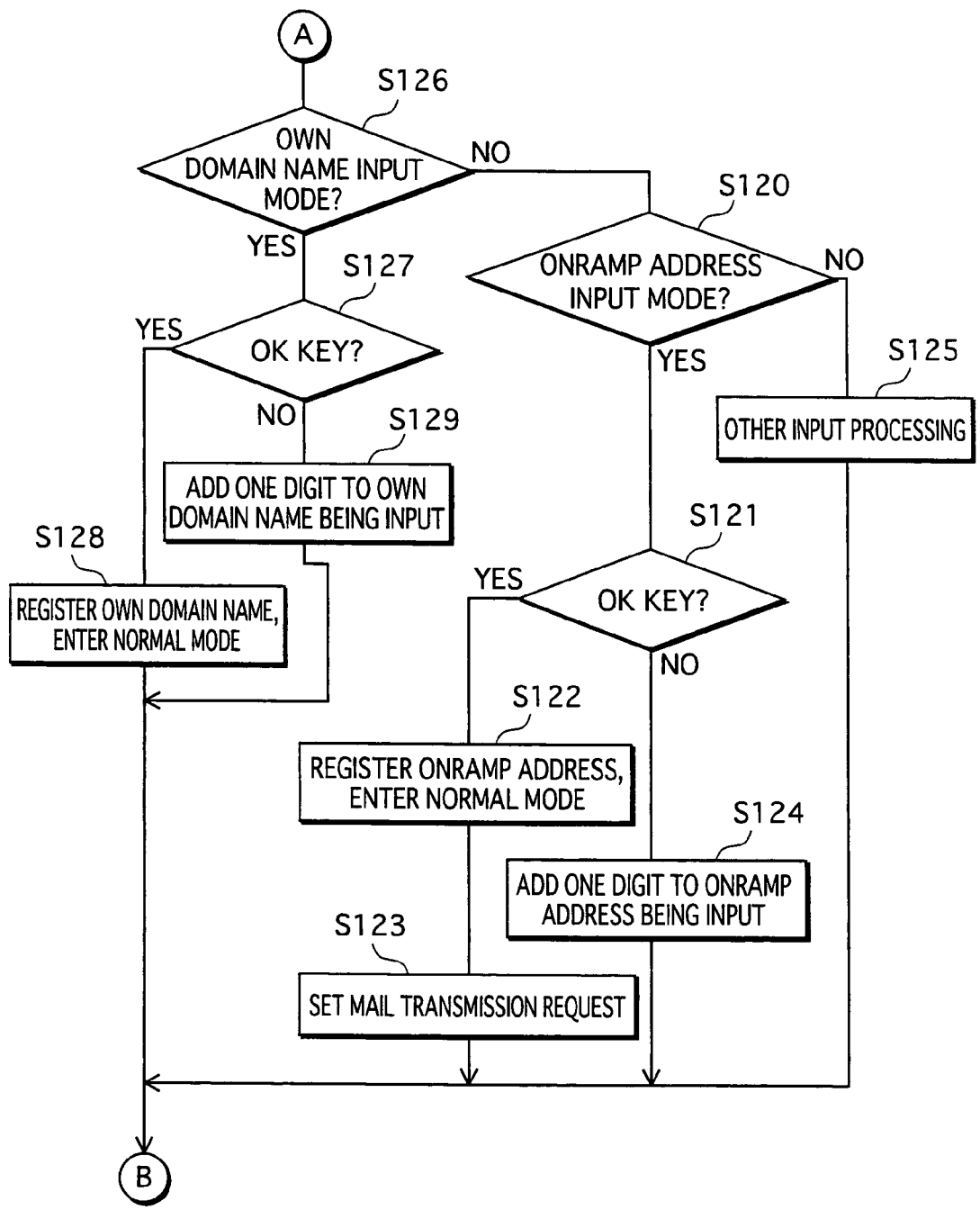
FIG. 15 is the flowchart illustrating the subroutine for the input processing performed by the controller.

FIGS. 14 and 15 are a flowchart illustrating a subroutine for the input processing.

As illustrated in FIG. 14, the controller 310 judges whether any input is made on the operation panel 340 by an operator (step S111). When judging that no input is made (step S111: NO), the controller 310 retunes to the main routine.

When judging that an input is made (step S111: YES), the controller 310 further judges whether the input is a push of the own telephone number input mode key 347 (step S112). When judging that the own telephone number input mode key 347 is pushed (step S112: YES), the controller 310 enters the own telephone number input mode (step S113), and then returns to the main routine. At that time, the controller 310 controls the display screen 341 to display an input screen for receiving key input of the telephone number of the MFP 300 from the operator. In the description below, when any input mode is selected, a display screen according to the selected input mode is displayed to receive operator input, and the input is completed at a push of the OK key 349.

On the input screen displayed, the operator can input the telephone number of the MFP 300, and complete the input by striking the OK key 349, whereby the input is submitted.

On the other hand, when judging that the input is not a push of the own telephone number input mode key 347 but a push of the onramp address input mode key 348 (steps S112: NO and S114:YES), the controller 310 enters the onramp address input mode (step S115), and then returns to the main routine.

After iteration of the routine, in the case where an input is made (step S111,YES), the input is neither a push of the own telephone number input mode key 347 nor a push of the onramp address input mode key 348 (steps S112: NO and S114: NO), the MFP 300 is in the own telephone number input mode (step S116: YES), and the OK key 349 is not yet pushed (step S117: NO), the controller 310 judges that the telephone number is being inputted by the operator. Consequently, the controller 310 adds the number inputted in the step S111 to an end of a string of numbers already inputted (step S119). The processing then returns to the main routine. At a push of the OK key 349 (step S117:YES), it is judged that the input of the telephone number is completed, so that the controller 310 stores the string of the already-inputted numbers as the telephone number of the MFP 300 into a predetermined area of the NVRAM 317, and shifts from the own telephone number input mode to the own domain name input mode (step S118). The processing then returns to the main routine.

Alternatively, when judging that the MFP 300 is not in the own telephone number input mode but in the own domain input mode (step S116: NO, and step S126 in FIG. 15: YES), and the OK key 349 is not yet pushed (step S127: NO), the controller 310 thus judges that a domain name is being inputted by the operator. Accordingly, the controller 310 adds a character inputted in the step S111 to an end of a string of already-inputted characters (step S129), and then returns to the main routine. At a push of the OK key 349 (step S127: YES), it is judged that the input of the domain name is completed, so that the controller 310 stores the already-inputted character string as the domain name of the MFP 300 into a predetermined area of the NVRAM 317. Subsequently, the controller 310 shifts from the own domain name input mode to a normal mode (the initial mode set on switch-on) (step S128), and then returns to the main routine.

Alternatively, when judging that the MFP 300 is not in the own domain input mode but in the onramp address input mode (steps S126: NO and S120: YES), and the OK key 349 is not yet pushed (step S121: NO), the controller 310 thus judges that an address of an onramp is being inputted by the operator. Consequently, the controller 310 adds a character inputted in the steps 111 to an end of a string of already-inputted characters (step S124), and then returns to the main routine. At a push of the OK key 349 (S121:YES), it is judged that the input of the onramp address is completed, so that the controller 310 stores the already-inputted character string as the onramp address into a predetermined area of the NVRAM 317. Subsequently, the controller 310 shifts from the onramp address input mode to the normal mode (step S122), and sets a mail transmission request by setting a mail transmission flag to "1" (step S123). The processing then returns to the main routine.

When judging that the MFP 300 is not in the onramp address input mode, either (step S120: NO), the controller 310 thus judges that the input made in the step S111 is another input. When judging, for example, that the start key 346 is pushed, the controller 310 causes copying to be started (step S125), and then returns to the main routine. In this respect, when performing the step S110, the controller 310 acts as a receiving unit for receiving input of device information of its own (of the MFP 300) and an address of an onramp on the communication network.

Figure 16:
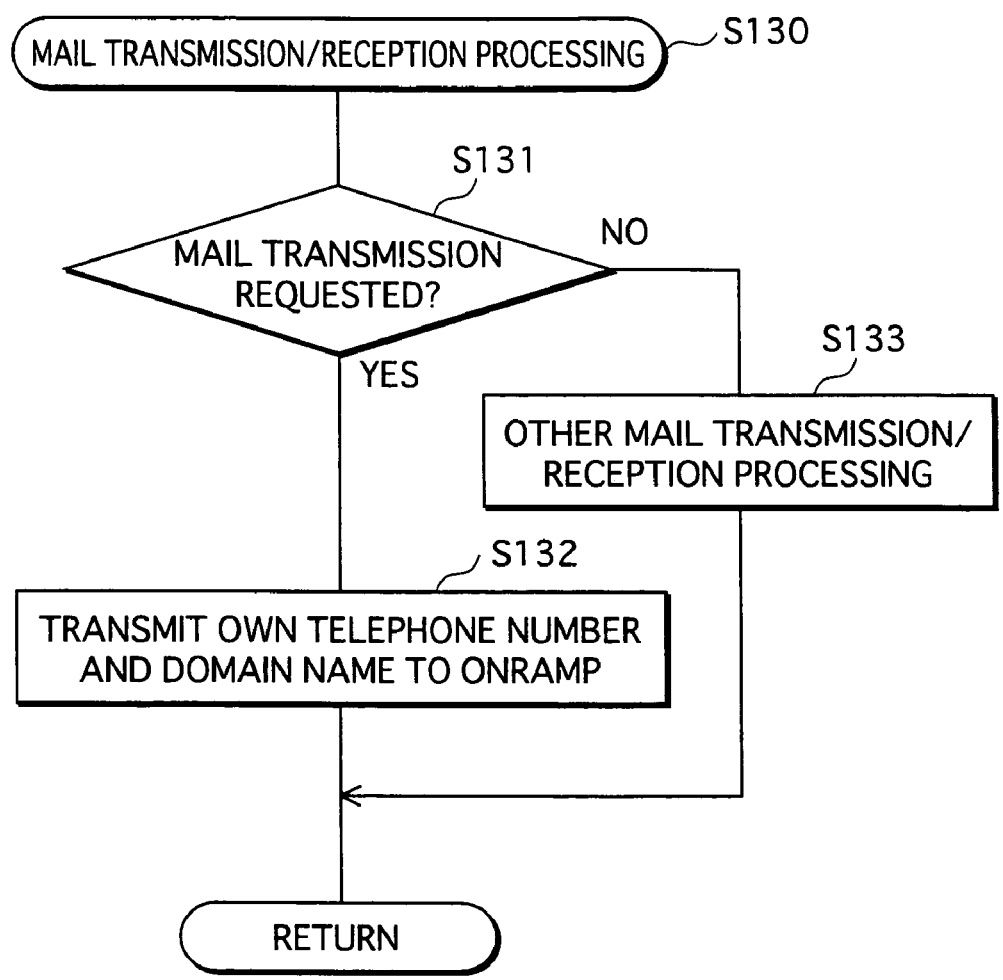
FIG. 16 is a flowchart illustrating a subroutine for mail transmission/reception processing performed by the controller.

FIG. 16 is a flowchart illustrating a subroutine for the mail transmission/reception processing.

As illustrated in the figure, the controller 310 judges whether a mail transmission request is set in the above step S123 (step S131). When judging that the mail transmission request is set (step S131:YES), and that the telephone number and domain name of the MFP 300 are registered (stored in the predetermined areas of the NVRAM 317), the controller 310 reads the registered data as offramp information. The controller 310 also reads the onramp address stored in the NVRAM 317. Subsequently, the controller 310 generates an offramp information mail F containing, in the message body, the read offramp information as well as a message indicating that the mail is to supply offramp information, and transmits the generated mail over the Internet 50 to the read onramp address (step S132). In this respect, when performing the step S132, the controller 310 acts as a transmitting unit for transmitting offramp information (device information) to an onramp.

Suppose, for example, the offramp information mail F is directed to the MFP 100. On receiving the offramp information mail F, the MFP 100 extracts the offramp information (i.e. the telephone number and domain name) of the MFP 300 from the message body of the received mail. When judging that the offramp information is of a new offramp, the MFP 100 stores the extracted offramp information into the offramp information table 118 held therein. In addition, the MFP 100 generates an offramp information mail N that contains the offramp information, and transmits the generated mail to other onramps (e.g. steps S238 and S232, which will be described later). Upon transmission of the mail in the step S132, the controller 310 of the MFP 300 resets the mail transmission flag to "0", thereby the mail transmission request is reset.

On the other hand, when judging in the step S131 that the mail transmission request is not set, the controller 310 performs other mail transmission/reception processing (step S133). Then, the processing returns to the main routine. To be more specific, for example, when a received mail contains a character string in the "TO" field and the character string includes a telephone number at position preceding "@", the controller 310 recognizes the mail as a forward request to that telephone number. Accordingly, the controller 310 acts as an offramp, and thus extracts from the received mail, FAX data and information showing the FAX destination information (i.e. the telephone number preceding "@"), and subsequently sets a forward request by setting the forward request flag to "1".

Figure 17:
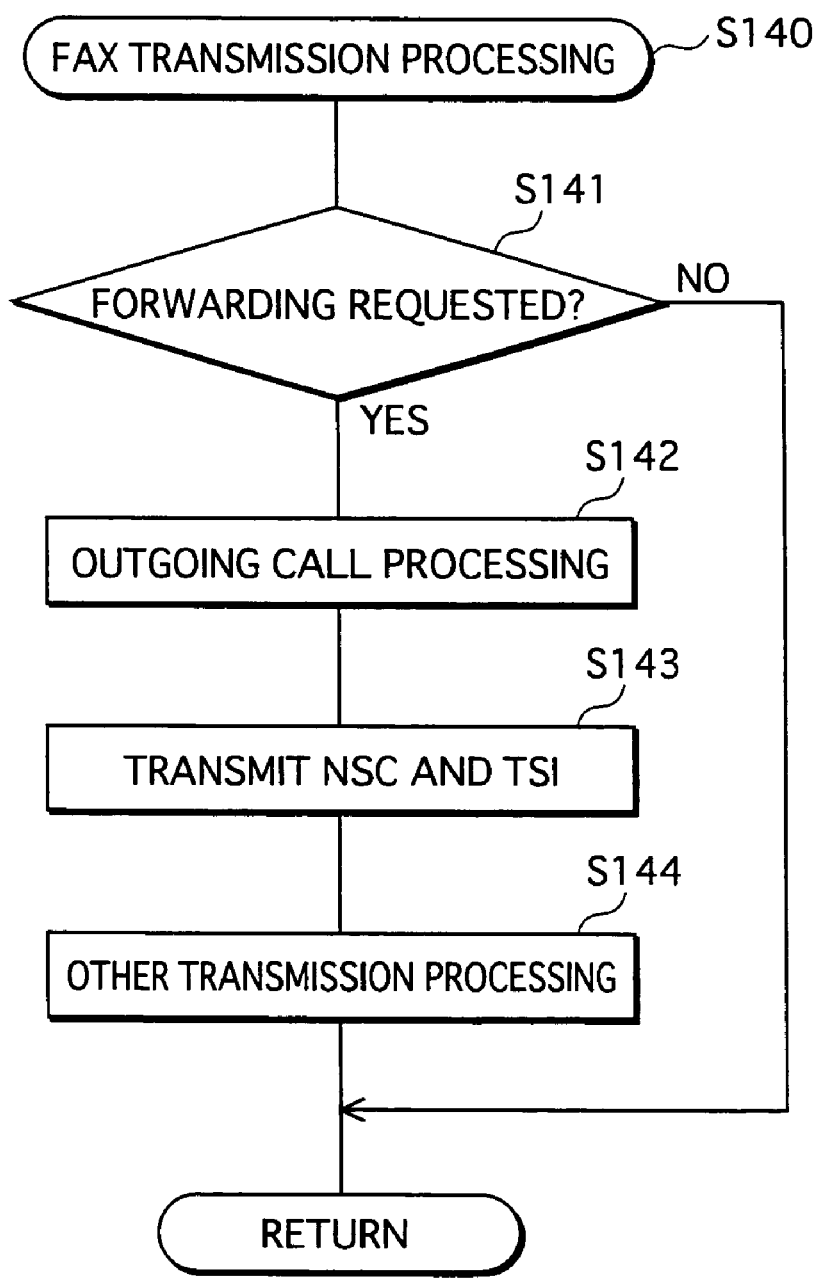
FIG. 17 is a flowchart illustrating a subroutine for FAX transmission processing performed by the controller.

FIG. 17 is a flowchart illustrating a subroutine for the FAX transmission processing.

As illustrated in the figure, when judging that the forward request is set in the above-described step S133 (step S141: YES), the controller 310 performs out going call processing using the telephone number shown by the extracted FAX destination information, thereby issuing an outgoing call to a receiving FAX machine (step S142).

When connection with the receiving FAX machine is established, the controller 310 performs exchange of signals (so called handshake) with the receiving FAX machine according to the FAX transmission control procedures. The controller 310 then transmits the extracted FAX data to the receiving FAX machine after conducing predetermined processing such as coding (steps S143 and S144). At the time of transmission, the controller 310 also sends out an NSC (Non-Standard Facilities Command) signal indicating that the MFP 300 is acting as an offramp and also a TSI (Transmitting Subscriber Identification) signal indicating the telephone number of the MFP 300. The NSC and TSI signals enable the receiving FAX machine to know the telephone number of the MFP 300 as well as that the MFP 300 is acting as an offramp. Description is given later for the reason for informing the receiving FAX machine about the MFP 300 being an offramp and the telephone number thereof. On performing FAX transmission in the step S144, the controller 310 sets the forward request flag to "0", thereby resetting the forward request.

On the other hand, when the controller 310 judges that the forward request is not set (step S141: NO), the processing simply returns to the main routine.

VI. Processing Performed by Onramps (MFPs 100 and 200)

Figure 18:
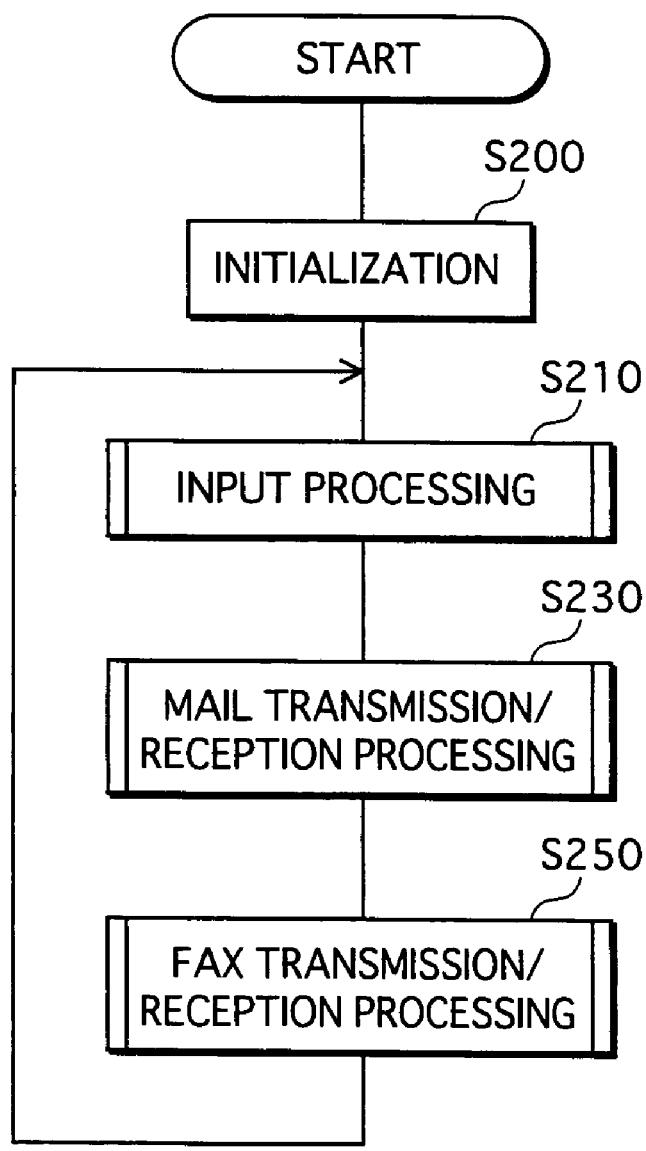
FIG. 18 is a flowchart illustrating a main routine of processing performed by a controller of the first MFP.

FIG. 18 is a flowchart illustrating a main routine of the processing performed by an onramp, specifically by the controller 110 of the MFP 100.

As illustrated in the figure, the controller 110 first performs initialization (step S200). Through the initialization, the RAM 116 is cleared, registers are set, and flags are reset.

After the initialization, input processing (step S210), mail transmission/reception processing (step S230), and FAX transmission/reception processing (step S250) are sequentially performed.

Figure 19:
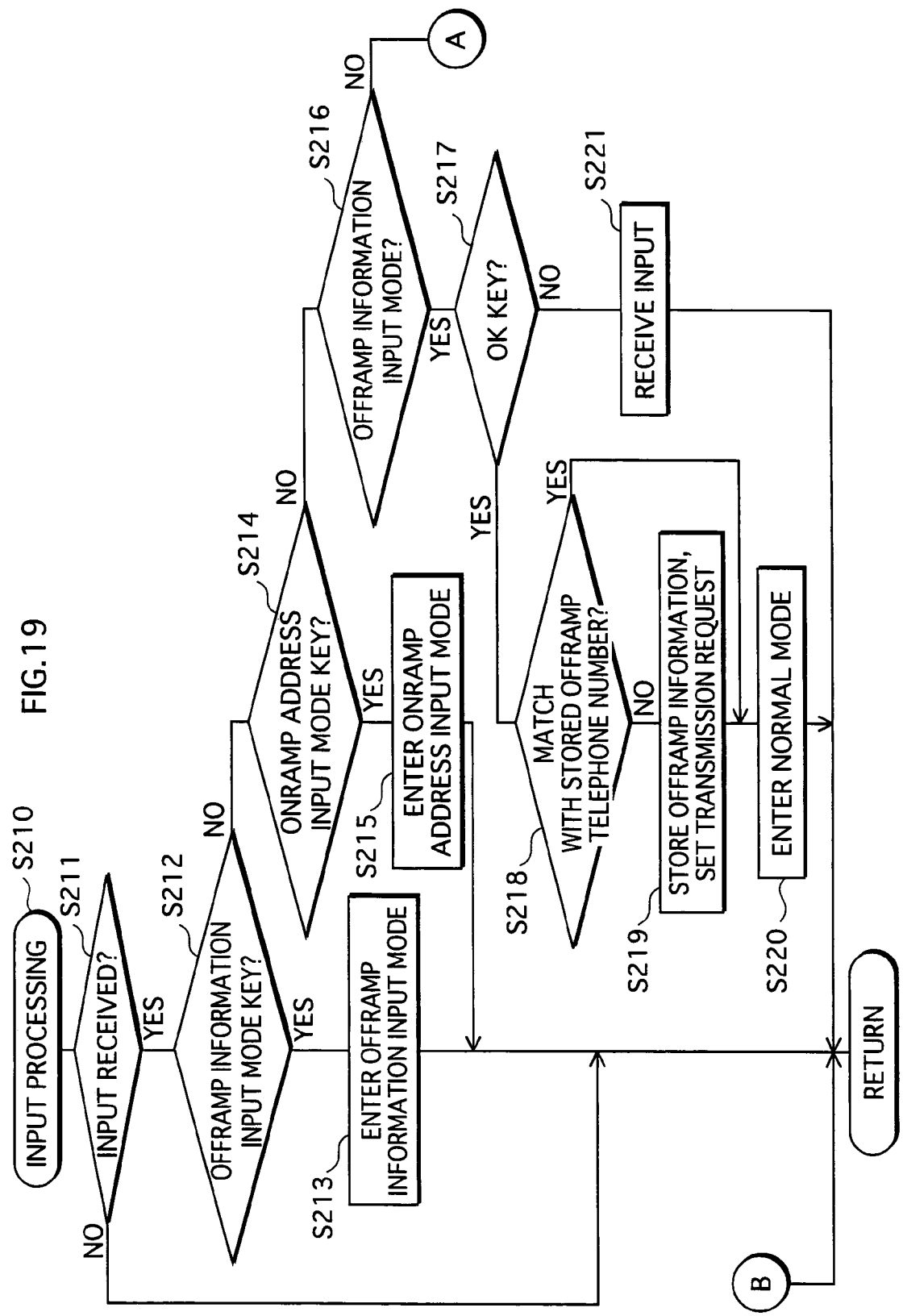
FIG. 19 is a flowchart illustrating a subroutine for input processing performed by the controller of the first MFP.
Figure 20:
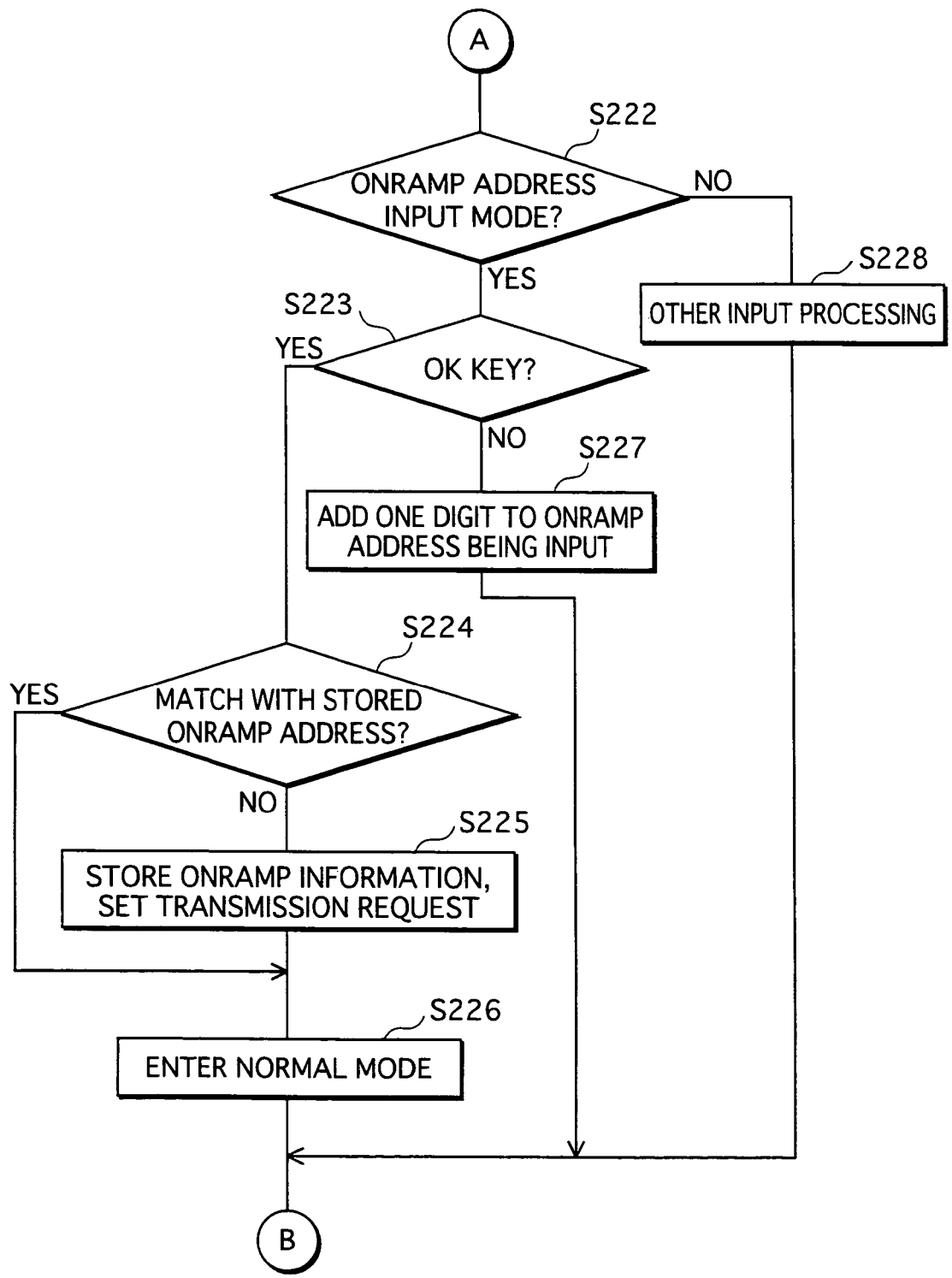
FIG. 20 is the flowchart illustrating the subroutine for the input processing performed by the controller of the first MFP.

FIGS. 19 and 20 are a flowchart illustrating a subroutine for the input processing.

As illustrated in FIG. 19, the controller 110 judges whether any input is made on the operation panel 150 by an operator (step S211). When judging that no input is made (step S211: NO), the controller 100 returns to the main routine.

When judging that an input is made (step S211: YES), on the other hand, the controller 110 further judges whether the input is a push of the offramp information input mode key 157 (step S212). When judging that the offramp information input mode key 157 is pushed (step S212: YES), the controller 110 enters the offramp information input mode (step S213), and then returns to the main routine. At that time, the controller 110 controls the display screen 151 to display an input screen for receiving key input of offramp information from the operator. On the input screen displayed, the operator can sequentially input the telephone number and domain name of an offramp, and completes the input by striking the OK key 159, whereby the input is submitted. Similarly to the above, when any input mode is selected, a display screen according to the selected input mode is displayed to receive operator input, and the input is completed at a push of the OK key 159.

On the other hand, when the input made in S211 is not a push of the offramp information input mode key 157 but a push of the onramp address input mode key 158 (steps S212: NO and S214: YES), the controller 110 enters the onramp address input mode (step S215), and then returns to the main routine.

After iteration of the routine, when it is judged that an input is made (step S211: YES), the input is neither a push of the offramp information input mode key 157 nor a push of the onramp address input mode key 158 (steps S212: NO and S214: NO), the MFP 100 is in the offramp information input mode (step S216: YES), and the OK key 159 is not yet pushed (step S217: NO), the controller 110 thus judges that a telephone number or domain name of an offramp is being inputted by the operator. Consequently, the controller 110 receives operator input (step S221), then returns to the main routine. In this respect, when performing the step S221, the controller 110 acts as a receiving unit for receiving input of offramp information (device information).

On the other hand, when the OK key 159 is pushed (step S217: YES), it is judged that the input is completed. Subsequently, the controller 110 judges whether the inputted telephone number is already stored in the offramp information table 118 (step S218). To this end, the controller 110 sequentially reads all the telephone numbers stored in the telephone number column of the offramp information table 118 to check whether any of the stored telephone numbers matches the inputted telephone number.

When judging that there is a match (step S218: YES), the controller 110 recognizes that the inputted offramp information is already registered. Thus, the controller 110 shifts to the normal mode (step S220), and then returns to the main routine.

On the other hand, when judging that there is no match (step S218: NO), the controller 110 recognizes that the inputted offramp information is of a new offramp, and thus additionally stores (registers) the telephone number and domain name of the new offramp to the offramp information table 118. Subsequently, the controller 110 sets an offramp information transmission request by setting the offramp information transmission flag to "1" (step S219), and moves on to the step S220. In this respect, when performing the step S219, the controller 110 acts as a device information storing unit for storing device information, and when performing the step S218, as a judging unit for judging whether inputted device information is already stored.

Alternatively, when it is judged that the MFP 100 is not in the offramp information input mode but in the onramp information input mode (step S216: NO and step S222 in FIG. 20: YES), and the OK key 159 is not yet pushed (step S223: NO), the controller 110 thus judges that an address of an onramp is being inputted by the operator. Consequently, the controller 110 adds an inputted character at the end of a string of already-inputted characters (step S227), and then returns to the main routine. At a push of the OK key 159 (step S223: YES), it is judged that the input of the onramp address is completed, so that the already-inputted character string is inputted as an onramp address. In response, the controller 110 judges whether the inputted on ramp address is already stored in the address column of the onramp information table 119 (step S224). To this end, the controller 110 sequentially reads all the addresses stored in the address column of the onramp information table 119 to check whether any of the stored addresses matches the inputted onramp address.

When judging that there is a match (step S224: YES), the controller 110 recognizes that the inputted onramp address is already registered. Thus, the controller 110 shifts to the normal mode (step S226), and then returns to the main routine.

On the other hand, when judging that there is no match (step S224: NO), the controller 110 recognizes that the inputted onramp address is of a new onramp, and thus additionally stores (registers) the inputted onramp address into the onramp information table 119. Subsequently, the controller 110 sets an onramp information transmission request by setting the onramp information transmission flag to "1" (step S225), and moves onto the step S226. In this respect, when performing the steps S223 and S227, the controller 110 acts as a recipient information acquiring unit for acquiring an onramp address on the communication network. When performing the step S225, the controller 110 acts as a recipient information storing unit for storing the acquired address to the onramp information table 119 that serves as a recipient address memory.

When judging that the MFP 100 is not in the onramp address input mode, either (step S222: NO), the controller 110 thus judges the input made in the step S211 is another input, and operates according to the received input (step S228). When judging, for example, that the operator inputs in the self-related device information input mode, the telephone number and address of the MFP 100, the controller 110 stores the received input to the self-related information memory unit 123. When judging that the start key 156 is pushed, the controller 110 causes copying to be started. The processing then returns to the main routine.

Figure 21:
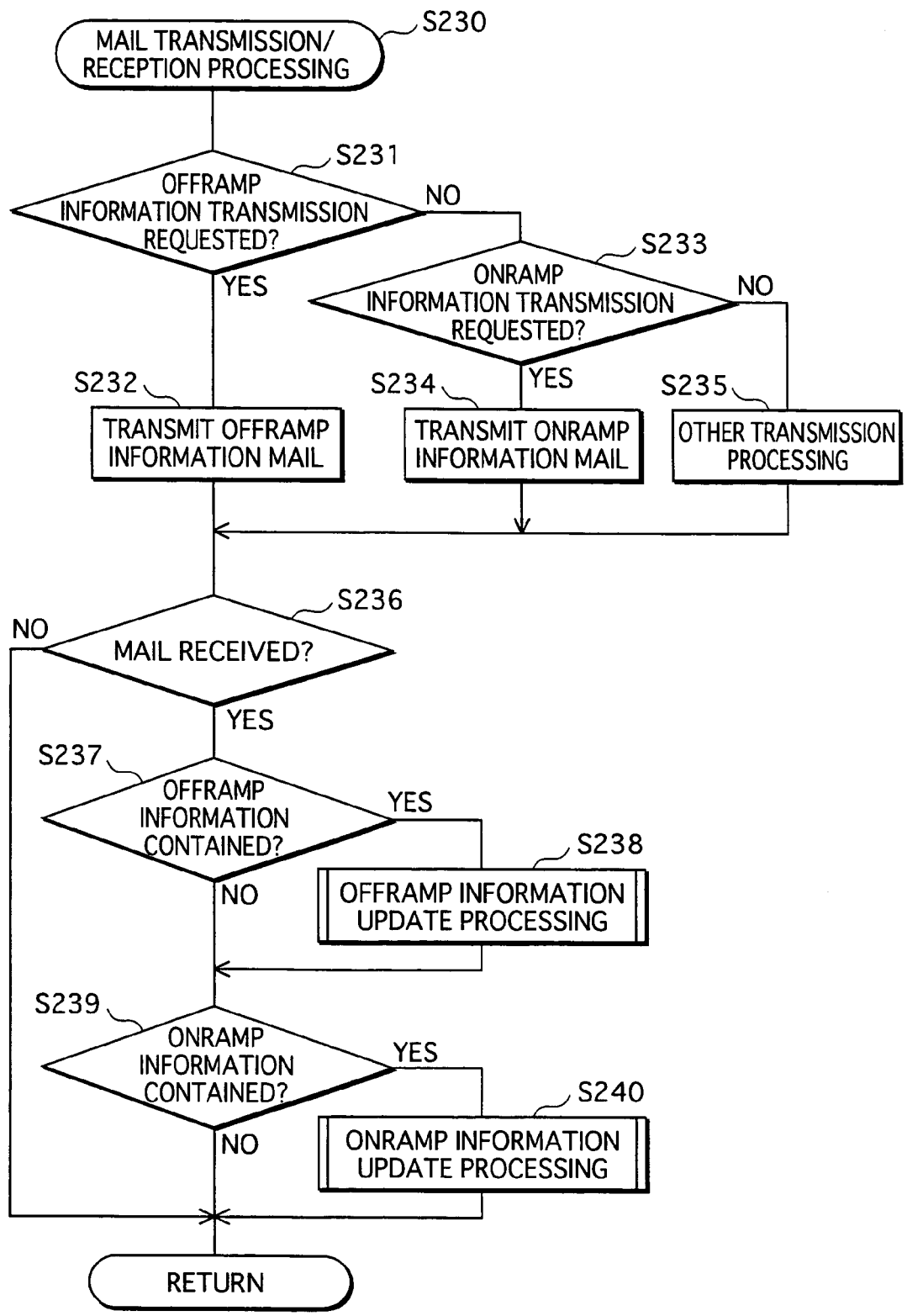
FIG. 21 is a flowchart illustrating a subroutine for mail transmission/reception processing performed by the controller of the first MFP.

FIG. 21 is a flowchart illustrating a subroutine for the mail transmission/reception processing.

As illustrated in the figure, when judging that the offramp information transmission request is set in the above-described step S219 (step S231: YES), the controller 110 reads all the offramp information stored (i.e. all the offramp telephone numbers and domain names stored) from the offramp information table 118 as well as all the onramp information stored (i.e. all the onramps addresses stored) from the onramp information table 119. The controller 110 then generates an offramp information mail N that contains in the message body, the read offramp information along with a message indicating that the mail is a notification of offramp information. The controller 110 then transmits the generated offramp information mail N over the LAN 101 and the Internet 50 to each of the read onramp addresses (step S232).

Suppose, for example, the offramp information mail N is transmitted to the MFP 200. On receiving the offramp information mail N, the MFP 200 extracts the offramp information from the message body of the received mail, and stores the extracted offramp information into the offramp information table held in the MFP 200. In addition, the MFP 200 generates an offramp information mail N that contains the offramp information, and transmits the thus generated offramp information mail N to other onramps (later-described steps of S237, S238, S231: YES, and S232).

On the other hand, when judging that an onramp information transmission request is set in the above-described step S225 (steps S231: NO and S233: YES), the controller 110 reads all the onramp information stored (i.e. all the onramp addresses stored) from the onramp information table 119. Subsequently, the controller 110 generates a mail that contains in the message body, the read onramp information along with a message indicating that the mail is a notification of onramp information. The controller 110 then transmits the thus generated onramp information mail over the Internet 50 to each of the read onramp addresses (step S234).

Suppose, for example, the onramp information mail is transmitted to the MFP 200. On receiving the onramp information mail, the MFP 200 extracts the onramp information from the message body. When judging that the extracted onramp information is new onramp information, the MFP 200 stores the onramp information to the onramp information table held in the MFP 200. In addition, the MFP 200 generates an onramp information mail that contains the onramp information, and transmits the thus generated onramp information mail to other onramps (later-described steps of S239, S240, S233: YES, and S234). In this respect, when performing the step S234, the controller 110 acts as a destination information transmitting unit for transmitting an address of an onramp on a communication network to one or more onramps.

At the time when the mail transmission is performed in the step S232, the controller 110 sets the offramp information transmission flag to "0", thereby resetting the offramp transmission request. Further, at the time when the mail transmission is performed in the step S234, the controller sets the onramp information transmission flag to "0", thereby resetting the onramp transmission request.

Further, when judging that neither an offramp information transmission request nor an onramp information transmission request is set (steps S231: NO and S233: NO), the controller 110 performs other transmission processing (step S235). For example, when the MFP 100 receives, as an onramp, a request for Internet FAX transmission from a FAX machine (sender), the controller 110 forwards FAX data as a mail attachment to an offramp selected through the transmission path selection processing. In this respect, when performing the step S235, the controller 110 acts as a forwarding unit for forwarding FAX data to a selected offramp.

Further, when receiving in the step S228 an input of its own address of the MFP 100 in the self-related information input mode, the controller 110 generates a mail containing in the message body, the inputted address along with a message indicating that the mail is notification of the onramp information (of the MFP 100), and transmits the thus generated mail to each onramp.

In a step S236, the controller 110 judges whether any mail is received. When judging that a mail is received (step S236: YES), the controller 110 further judges whether the received mail contains offramp information, i.e. whether the mail is either an offramp information mail F or N (step S237). The judgment is made based on whether the main body of the received mail contains a message indicating that the mail is a notification of offramp information. In this respect, when performing the step S236, the controller 110 acts as a receiving unit for receiving offramp information (device information).

When judging that offramp information is contained (step S237: YES), the controller 110 performs the offramp information update processing (step S238).

Figure 22:
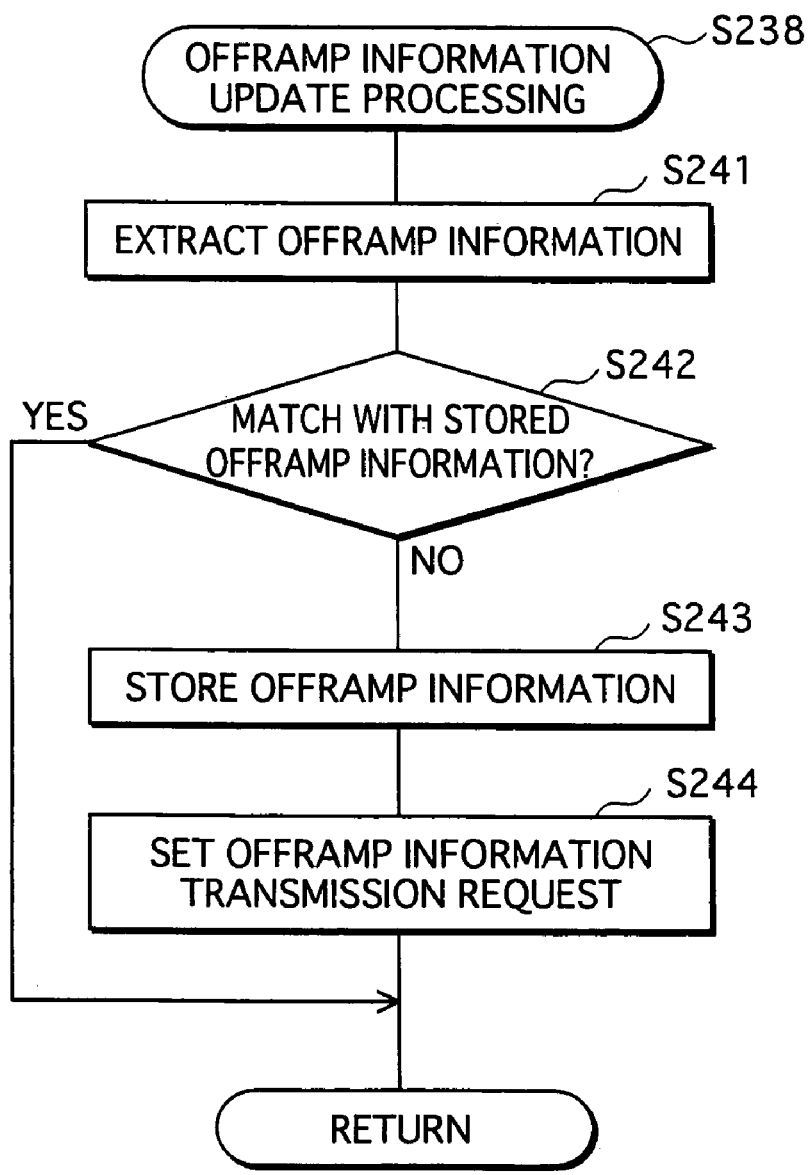
FIG. 22 is a flowchart illustrating a subroutine for offramp information update processing performed by the controller of the first MFP.

FIG. 22 is a flowchart illustrating a subroutine for the offramp information update processing.

As illustrated in the figure, the controller 110 first extracts the offramp information (the telephone number and domain name of an offramp) from the main body of the received mail (step S241). Next, the controller 110 judges whether the extracted offramp information is already stored in the offramp information table 118 (step S242). When it is judged that the offramp information is already stored (step S242: YES), the processing returns to the subroutine for the mail transmission/reception processing.

When it is judged that the offramp information is not yet stored in the offramp information table 118 (step S242: NO), the controller 110 recognizes that the offramp information is of a new offramp, and thus assigns a new offramp number as an ID to the new offramp, and additionally stores the assigned offramp number, the extracted telephone number and domain name to the respective columns of the offramp information table 118 (step S243). Subsequently, the controller 110 sets an offramp information transmission request by setting the offramp information transmission flag to "1" (step S244). The processing then returns to the subroutine for the mail transmission/reception processing. The operations performed in the steps S243 and S244 are substantially identical to the step S219.

Since an offramp information transmission request is set in the step S244, after iteration of the routine, the judgment in the step S231 results in "YES". Consequently, the step S232 is performed, so that an offramp information mail N is transmitted to other onramps.

That is to say, when acquiring offramp information of a new offramp, the MFP 100 transmits the acquired offramp information to other onramps irrespective of whether the offramp information is inputted directly to the MFP 100 (step S210) or by way of a-mail received from another onramp or offramp (steps S236, S237, and S238). In this respect, when performing the steps S210, S236, and S241, the controller 110 acts as a device information acquiring unit for acquiring offramp information (device information). Further, when performing the step S243, the controller 110 acts as a device information storing unit for storing device information. Still further, when performing the step S232, the controller 110 acts as a device information transmitting unit for transmitting device information to other onramps. Still further, when performing the step S242, the controller 110 acts as a judging unit for judging whether received device information is already stored.

With the above arrangement, each onramp receives offramp information of a new offramp from other onramps. In other words, all the administrators of onramps are saved from the trouble of manually inputting offramp information each time an offramp is added to the system 1.

Referring back to FIG. 21, when judging that the received mail does not contain offramp information (step S237: NO), the controller 110 further judges whether onramp information is contained, i.e. whether the mail is an onramp information mail (step S239). The judgment is made based on whether the main body of the received mail contains a message indicating that the mail is a notification of onramp information. Note that the mail transmitted in the step S235 is also judged as an onramp information mail.

When judging that the received mail is an onramp information mail (step S239: YES), the controller 110 performs the onramp information update processing (step S240).

Figure 23:
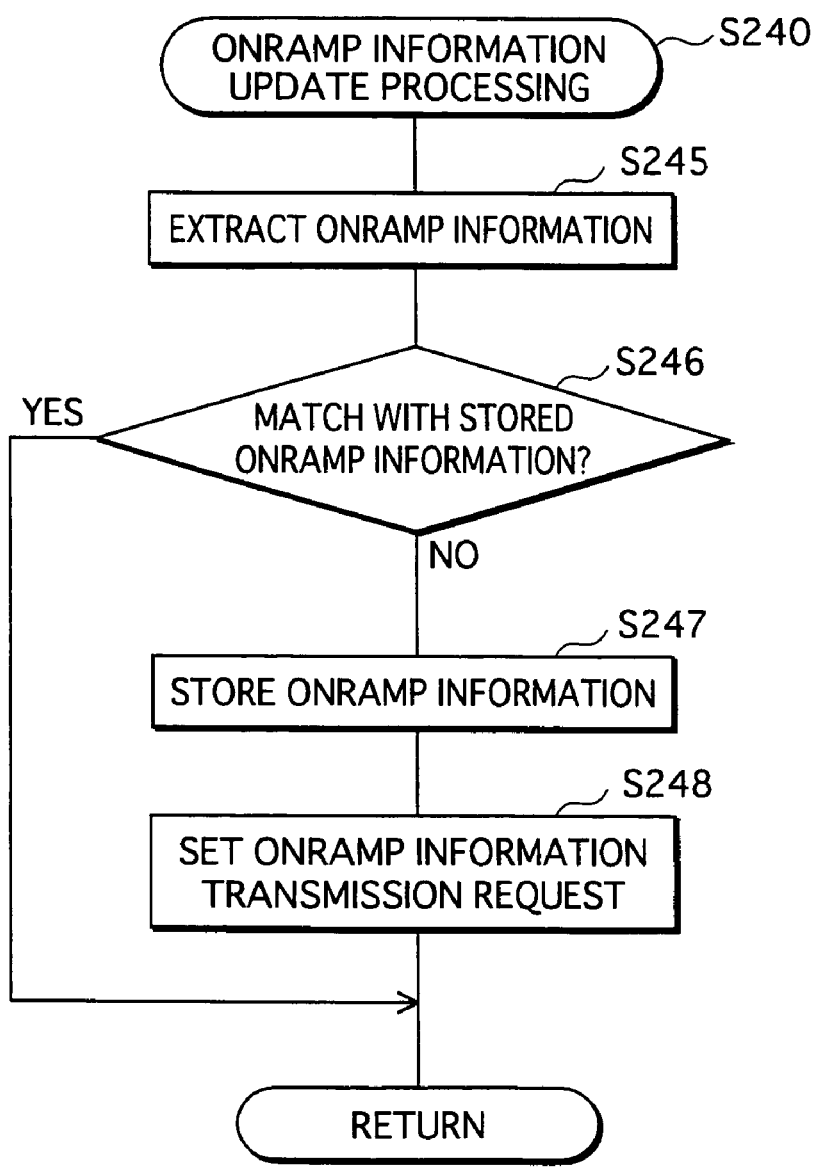
FIG. 23 is a flowchart illustrating a subroutine for onramp information update processing performed by the controller of the first MFP.

FIG. 23 is a flowchart illustrating a subroutine for the onramp information update processing.

As illustrated in the figure, the controller 110 first extracts onramp information from the message body of the received mail (step S245). Next, the controller 110 judges whether the extracted onramp information (onramp address) is already stored in the onramp information table 119 (step S246). When it is judged that the onramp information is already stored (step S246: YES), the processing returns to the subroutine for the mail transmission/reception processing.

On the other hand, when judging that the extracted onramp information is not yet stored (step S246: NO), the controller 110 recognizes that the onramp information is of a new onramp, and thus assigns a new onramp number as an ID to the new onramp, and additionally stores the onramp number and the extracted onramp address to the respective columns of the onramp information table 119 (step S247). Subsequently, the controller 110 sets the onramp information transmission request by setting an onramp information transmission flag to "1" (step S248), and then returns to the subroutine for the mail transmission/reception processing. Note that the operations performed in the steps S246-S248 are substantially identical to the steps 224 and S225.

In this respect, when performing the steps S236 and S239, the controller 110 acts as a recipient information acquiring unit for acquiring an address of an onramp on a communication network, and when performing the steps S246 and S247, as a recipient information storing unit for storing the acquired address to the onramp information table 119 serving as the recipient information memory.

Since an onramp information transmission request is set in the step S248, after iteration of the routine, the judgment in the step S233 results in "YES". Consequently, the step S234 is performed, so that an onramp information mail is transmitted to other onramps.

That is to say, when acquiring onramp information of a new onramp, the MFP 100 transmits the acquired onramp information to other onramps irrespective of whether the onramp information is inputted directly to the MFP 100 (step S210) or by way of an onramp information notification mail received from another onramp (steps S236, S239, and S240). With the above arrangement, it is realized that each onramp receives onramp information of a new onramp from other onramps. In other words, similarly to the above-described offramp information transmission, all the administrators of onramps are saved from the trouble of manually inputting an onramp address each time an onramp is added to the system 1.

Referring back to FIG. 21, when it is judged that the received mail does not contain onramp information (step S239: NO), the processing returns to the main routine.

Figure 24:
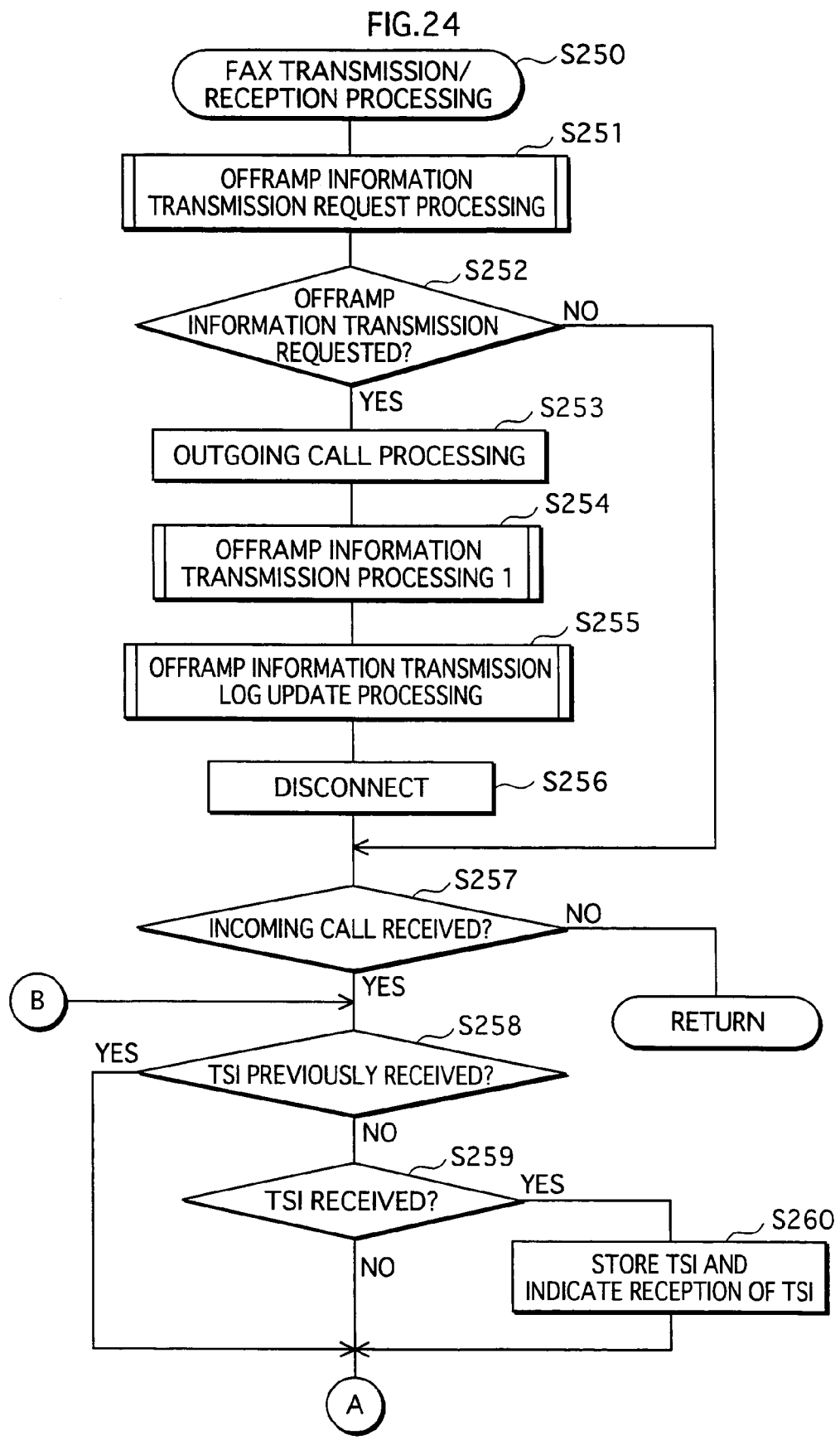
FIG. 24 is a flowchart illustrating a subroutine for FAX transmission/reception processing performed by the controller of the first MFP.
Figure 25:
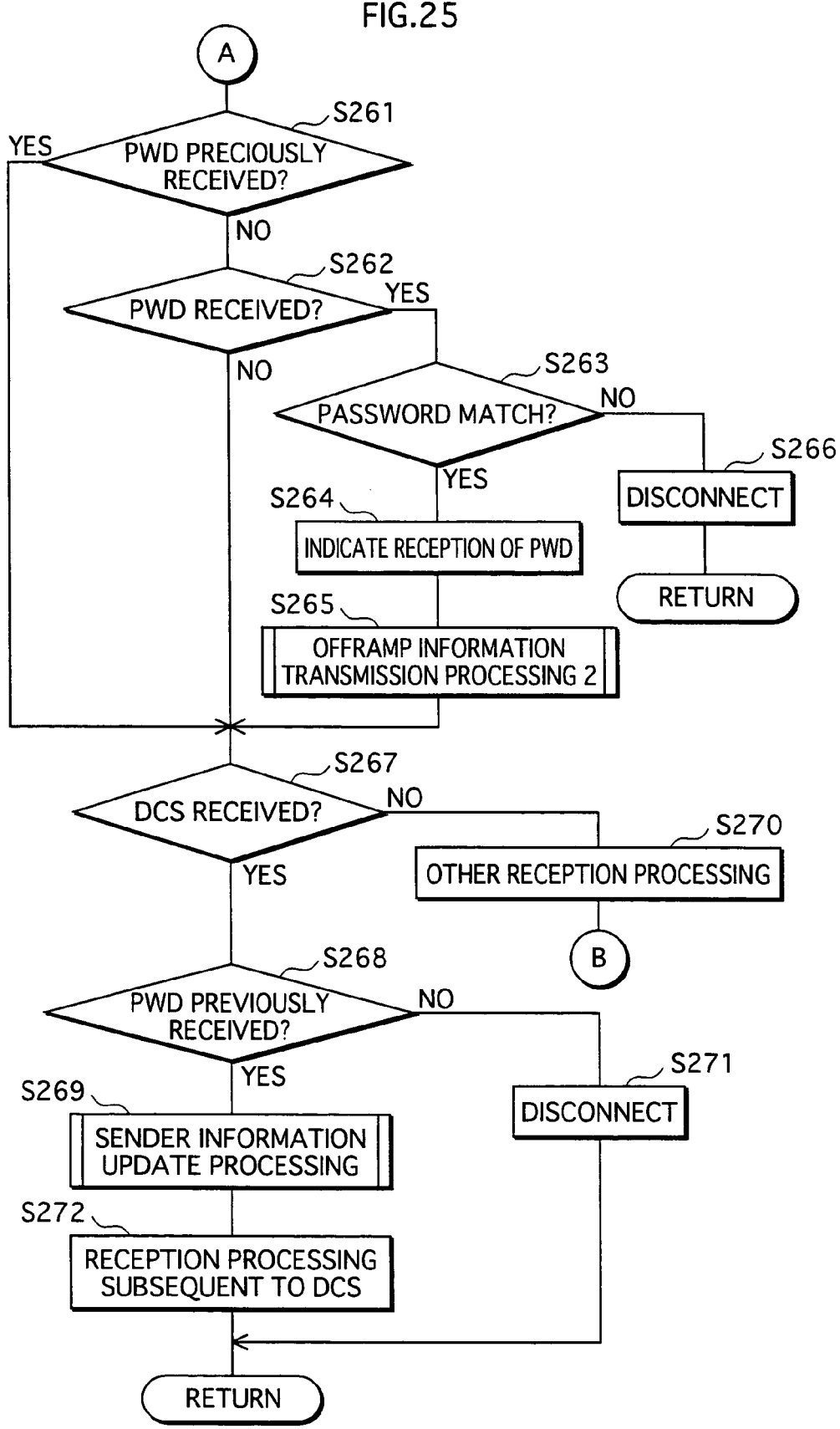
FIG. 25 is the flowchart illustrating the subroutine for the FAX transmission/reception processing performed by the controller of the first MFP.

FIGS. 24 and 25 are a flowchart illustrating a subroutine for the FAX transmission/reception processing.

As illustrated in FIG. 24, the controller 110 performs the offramp information transmission request processing (step S251).

Figure 26:
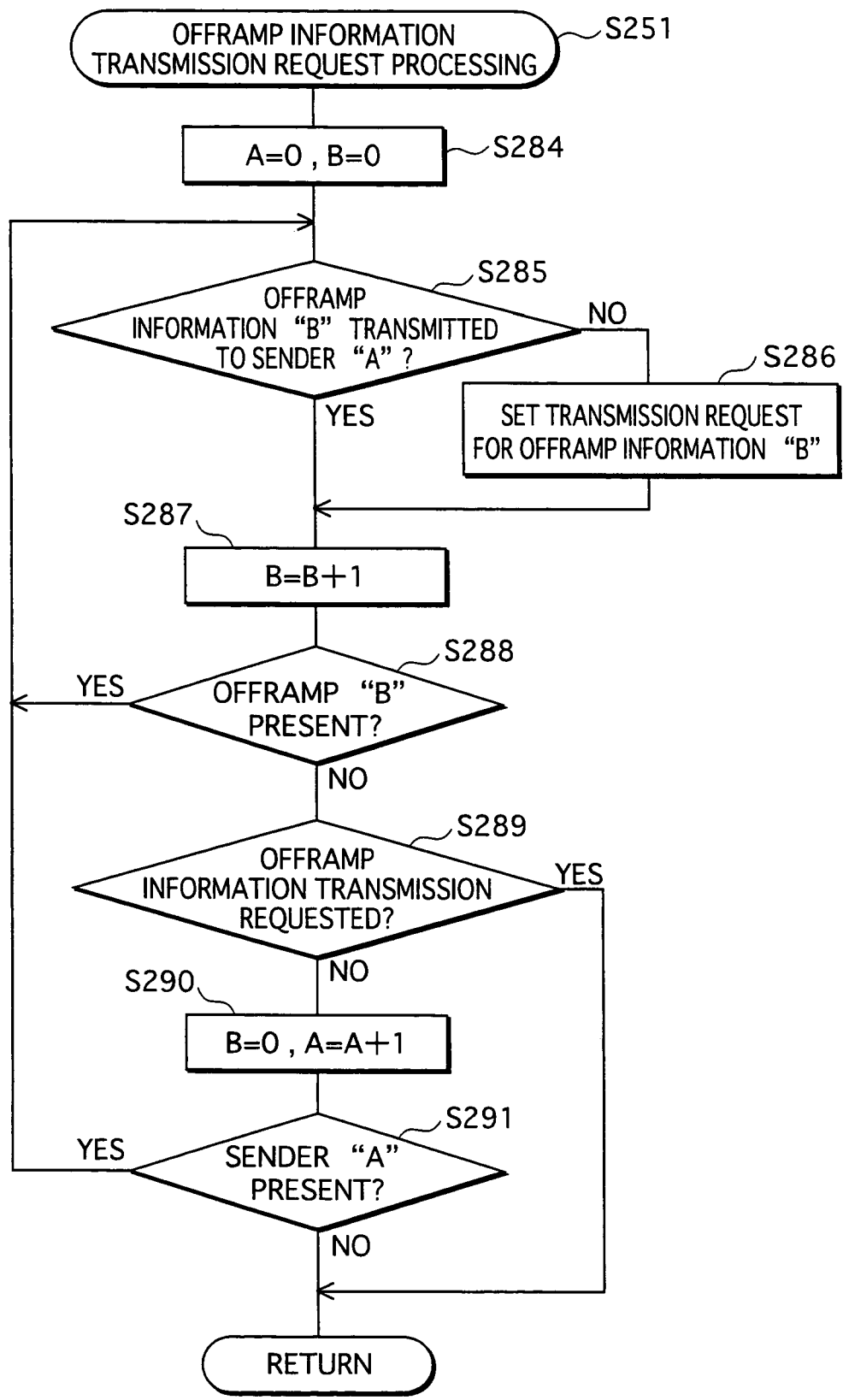
FIG. 26 is a flowchart illustrating a subroutine for offramp information transmission request processing performed by the controller of the first MFP.

FIG. 26 is a flowchart illustrating a subroutine for the offramp information transmission request processing. Through the processing, it is judged whether offramp information of each offramp has been transmitted to each FAX machine stored in the sender information table 120, and when judging that offramp information is not yet transmitted to any of the FAX machines stored in the sender information table 120, a transmission request is set to request the transmission.

As illustrated in the figure, the controller 110 first sets variables A and B to "0" (step S284). With reference to the offramp information transmission log table 121, let the variable A denote a sender number and B denote an offramp number, and then judges whether offramp information of the offramp corresponding to the offramp number B="0" has-been transmitted to a sender identified by the sender number A "0" (step S285) In the example of FIG. 9, the cell 1213 in the column "0" and the row "0" stores a value "1" which indicates that corresponding offramp information has been transmitted.

When judging that the transmission has been performed (step S285: YES), the controller 110 increments the value of B by "1" (step S287), and judges whether there is an offramp corresponding to the offramp number B (step S288). The judgment is made by referring the offramp information transmission log table 121 to check whether there is an offramp number having the value of B in the offramp number column.

When judging that there is an offramp corresponding to the offramp number B, which holds the value "1" at this stage (step S288), the controller 110 goes back to the step S285 to judge whether offramp information of the offramp corresponding to the offramp number "1" has been transmitted to the sender identified by the sender number "0". In the example of FIG. 9, the value stored in the cell 1214 is "0", which means that the offramp information has not been transmitted yet.

When judging that the transmission has not yet been performed (step S285: NO), the controller 110 additionally stores to the offramp information transmission request table 122, the current values of A and B in the sender number column and the offramp number column, respectively (so that a transmission request is set for offramp information of the offramp B to the sender A) (step S286), and then moves onto the step S287. In the example illustrated in FIG. 10, "0" and "1" are newly stored in the sender number column and offramp number column, respectively.

The steps S285-S288 are repeated, so that it is judged that which offramp information has not been transmitted to the FAX machine corresponding to the sender number A="0". On finding an offramp of which offramp information has not been transmitted, the controller 110 additionally stores the offramp number (B=0, 1 . . . ) of that offramp into the offramp number column of the offramp information transmission request table 122.

When judging in the step S288 that there is no offramp corresponding to the offramp number B, the controller 110 moves onto the step S289 to judge whether the offramp information transmission request table 122 at the time contains any offramp number in the offramp number column (whether a transmission request is set).

When it is judged that a transmission request is set (step S289: YES), the processing returns to the subroutine for the FAX transmission/reception processing.

On the other hand, when judging that no transmission request is set (step S289: NO), the controller 110 resets the value of B to "0" and increments the value of A by "1" (step S290), and subsequently judges whether there is a sending FAX machine corresponding to the sender number A (step S291). This judgment is made by searching the offramp information transmission log table 121 to check whether the value A is contained in the sender number column.

When judging that there is a sending FAX machine corresponding to the sender number A, which takes on a value "1" at this stage (step S291: YES), the controller 110 goes back to the step S285, so that it is judged whether offramp information corresponding to the offramp number "0" has been transmitted to the Fax machine corresponding to the sender number "1". Thereafter, the steps S285-S289 are repeated similarly to the processing performed with respect to the sender number A="0". As a result, it is judged that which offramp information has not been transmitted to the FAX machine corresponding to the sender number A="1". On finding an offramp of which offramp information has not been transmitted, the controller 110 additionally stores the offramp number (B=0, 1 . . . ) of that offramp to the offramp information transmission request table 122.

When it is judged that a transmission request is set regarding the FAX machine corresponding to the sender number "1" (step S289: YES), the processing returns to the subroutine for the FAX transmission/reception processing. On the hand, when it is judged that no transmission request is set (step S289: NO), the controller 110 goes back to the step S290, so that the value of A="2", and subsequently repeats the same processing as the above until a transmission request is set. Note that when it is judged in the step S291 that there is no FAX machine corresponding to the sender number A, the processing returns to the subroutine for the FAX transmission/reception processing.

Referring back to FIG. 24, in a step S252, the controller 110 judges whether an offramp information transmission request is set. This judgment is made based on whether the offramp information transmission request table 122 contains one or more sender numbers and offramp numbers.

When judging that an offramp information transmission request is set, i.e. the offramp information transmission request table 122 contains a sender number and an offramp number (step S252: YES), the controller 110 reads the telephone number of the FAX machine corresponding to the sender number from the sender information table 120, and performs outgoing call processing to issue a call to that FAX machine (step S253). In the example of FIG. 8, when the sender number is "0" (the FAX machine 60), the telephone number "06-1234-5678" is read from the sender information table 120. In response to the call issued, the MFP 100 is connected to the FAX machine 60 over the public network 20.

Subsequently, the controller 110 performs offramp information transmission processing 1 (step S254) and offramp information transmission log update processing (step S255).

Figure 27:
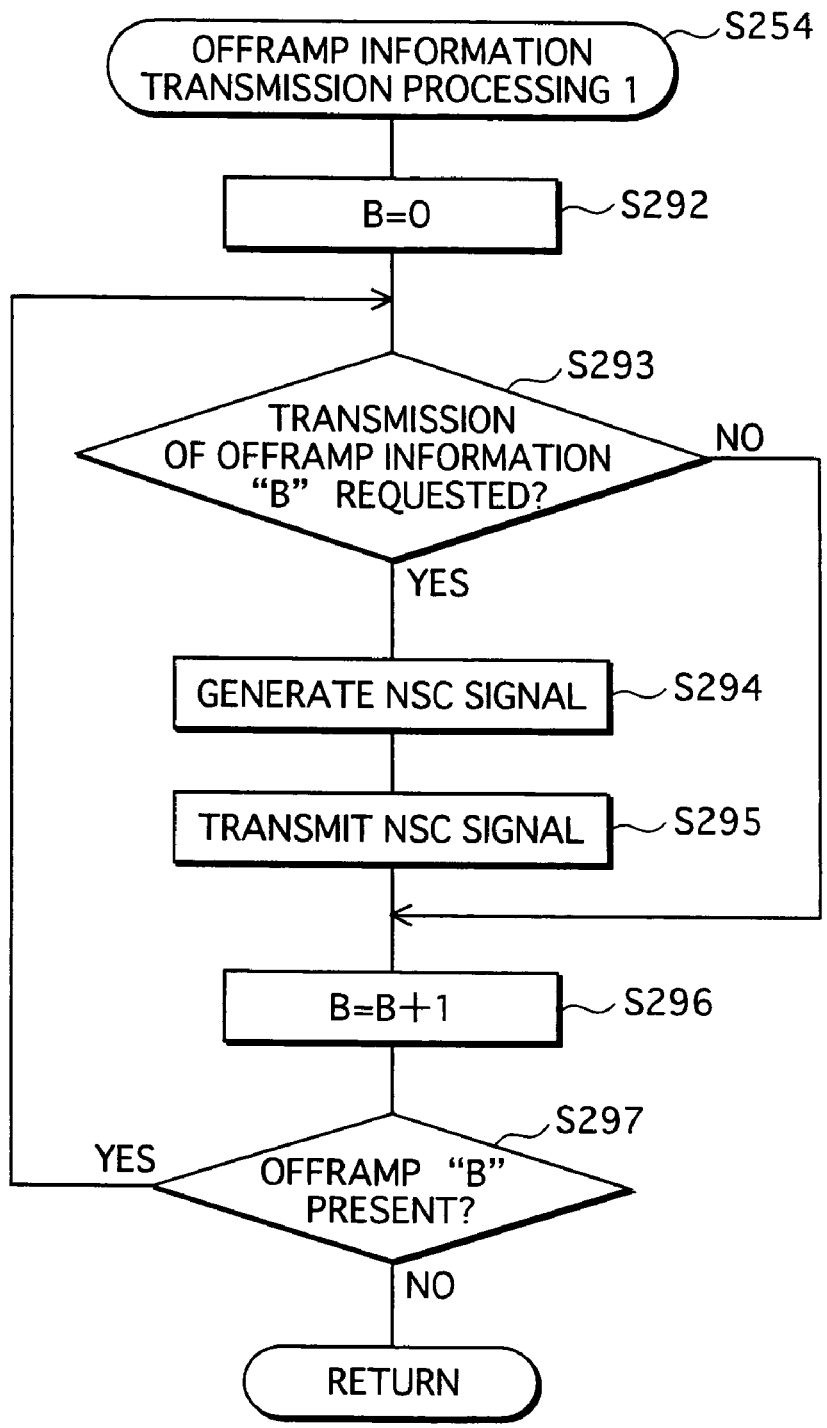
FIG. 27 is a flowchart illustrating a subroutine for offramp information transmission processing 1 performed by the controller of the first MFP.

FIG. 27 is a flowchart illustrating a subroutine for the offramp information transmission processing 1.

As illustrated in the figure, the controller 110 first sets the value of a variable B to "0" (step S292).

Next, the controller 110 judges whether there is a transmission request for offramp information corresponding to the offramp number "0" (step S293). This judgment is made by referring to the offramp information transmission request table 122 to check whether the offramp number column contains the number "0". For the sake of convenience, description hereinafter is given by way of the example of the offramp information transmission request table 122 illustrated in FIG. 10.

When judging that no transmission request is set, i.e. the offramp number "0" is not contained in the offramp number column (step S293: NO), the controller 110 increments the current value "0" of the variable B, so that B="1" (step S296), and judges whether there is an offramp corresponding to the offramp number "1" (step S297). This judgment is made by referring the offramp information transmission log table 121 to check whether the offramp number column contains the value of B.

When judging that there is an offramp corresponding to the offramp number "1" (step S297: YES), the controller 110 goes back to the step S293 to judge whether there is a transmission request for offramp information corresponding to the offramp number "1". This judgment is made by referring to the offramp information transmission request table 122 to check whether the offramp number column contains the offramp number "1".

Here, the controller 110 judges that there is such a transmission request (step S293: YES), and thus reads from the offramp information table 118, the telephone number of the offramp corresponding to the offramp number "1". Subsequently, the controller 110 generates an NSC signal composed of information showing that the signal contains an offramp telephone number as well as information showing the read telephone number in predetermined bit positions (step S294), and transmits the generated NSC signal (S295).

The steps S293-S296 are repeated until it is judged in the step S297 that there is no offramp corresponding to the offramp number B. When judging that there is no such an offramp (step S297: NO), the controller 110 returns to the subroutine of the FAX transmission/reception processing. Through the above steps, the telephone numbers of all the offramps corresponding to offramp numbers contained in the offramp number column are transmitted to the FAX machine (the FAX machine 60 in this example) corresponding to the sender number contained in the sender number column of the offramp information transmission request table 122. On receiving an NSC signal containing the offramp telephone numbers, the FAX machine performs the offramp information update processing (a later-described step S434) to extract the offramp telephone numbers from the received NSC signal, and stores the extracted telephone number if they are of new offramps.

In this respect, when performing the step S254, the controller 110 acts as a transmitting unit for transmitting an offramp telephone number serving as an address on the telephone network to a FAX machine.

Figure 28:
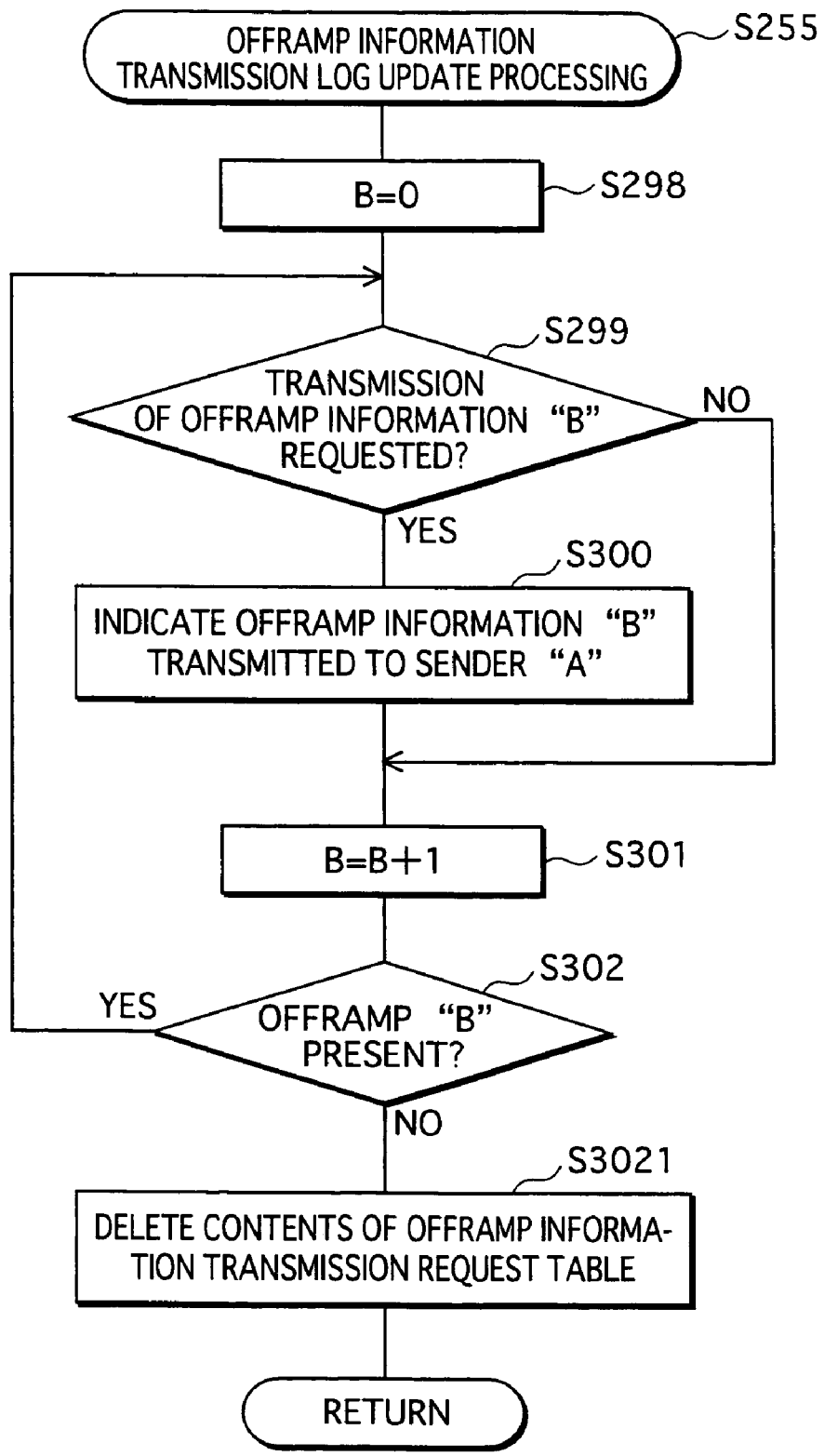
FIG. 28 is a flowchart illustrating a subroutine for offramp information transmission log update processing performed by the controller of the first MFP.

FIG. 28 is a flowchart illustrating the subroutine for the offramp information transmission log update processing. Through this processing, the offramp information transmission log table 121 is updated.

As illustrated in the figure, the controller 110 first sets value of a variable B to "0" (step S298).

Next, the controller 110 judges whether there is a transmission request for offramp information corresponding to the offramp number "0" (step S299). This judgment is made by referring to the offramp information transmission request table 122 to check whether the offramp number column contains the offramp number "0". Similarly to the offramp information transmission processing 1, description hereinafter is given by way of the example of the offramp information transmission request table 122 illustrated in FIG. 10.

When judging that there is no transmission request, i.e. the offramp number column does not contain the number "0" (step S299: NO), the controller 110 increments the current value "0" of the variable B, so that B="1" (step S301), and judges whether there is an offramp corresponding to the offramp number "1" (step S302). This judgment is made by referring to the offramp information transmission log table 121 to check whether the offramp number column contains the value of B.

When judging that there is an offramp corresponding to the offramp number "1" (step S302: YES), the controller 110 goes back to the step S299 to judge whether there is a transmission request for offramp information of the offramp corresponding to the offramp number "1". This judgment is made by referring to the offramp information transmission request table 122 to check whether the offramp number column contains the number "1".

Here, the controller 110 judges that there is such a transmission request (S299: YES), and thus updates the offramp information transmission log table 121. To be more specific, the controller 110 alters the value held in the offramp number column "1" on the sender number row "A" (i.e. the cell 1214 in the above example) from "0" to "1", so that it is indicated that corresponding transmission has been performed (step S300).

The steps S299-S301 are repeated until it is judged in the step S302 that there is no offramp corresponding to the offramp number B. When judging that there is no such an offramp (step S302: NO), the controller 110 erases (resets) the contents of the offramp information transmission request table 122 (step S3021), and returns to the subroutine for the FAX transmission/reception processing. Through the above steps, the offramp information transmission log table 121 is updated to show current information as to which offramp information has been transmitted to which FAX machines.

Referring back to FIG. 24, in a step S256, the controller 110 disconnects a FAX machine currently in communication (i.e. the FAX machine 60 in this example), and moves onto a step S257.

In the step S257, the controller 110 judges whether there is an incoming call. When judging that no incoming call is received (step S257: NO), the controller 110 returns to the main routine.

On the other hand, when judging that an incoming call is received (step S257: YES), the controller 110 judges whether a TSI signal has been received from the sender (i.e. the FAX machine 60) through exchange of signals according to the FAX transmission control procedures (step S258). This judgment is made by referring to a TSI signal flag set in a later-described step S260. When set to "0", the TSI signal flag indicates "Not Received", while indicating "Received" when set to "1". When judging that a TSI signal has been received (step S258: YES), the controller 110 moves onto a step S261.

On the other hand, when judging that a TSI signal has not been received previously but is now received (steps S258: NO and S259: YES), the controller 110 temporarily stores information contained in the received TSI signal, showing a telephone number of the sender (i.e. the FAX machine 60). Further, the controller 110 sets the TSI signal flag from "0" to "1" to indicate that a TSI signal has been received (step S260), and goes onto the step S261.

In the step S261, the controller 110 judges whether an F-code PWD (password) signal has been received. This judgment is made by referring to a password flag set in a later-described step S264. When set to "0", the password flag indicates "Not received", while indicating "Received" when set to "1". When judging that a password signal has been received (step S261: YES), the controller 110 moves onto a later-described step S267.

On the other hand, when judging that a password signal has not been received previously but is now received (steps S261: NO, and S262: YES), the controller 110 further judges whether a password contained in the received PWD signal matches any password preliminarily registered with the MFP 100 (step S263).

When the two passwords do not match (step S263: NO), it is judged that the communication currently performed may be with an unidentified device external to the system 1, so that the controller 110 forcefully disconnects the connection (step S266), and returns to the main routine.

On the other hand, when judging that the passwords match (step S263: YES), the controller 110 sets the password flag from "0" to "1" to indicate that the password has been received (step S264). The controller 110 subsequently performs the offramp information transmission processing 2, and then moves onto the step S267.

Figure 29:
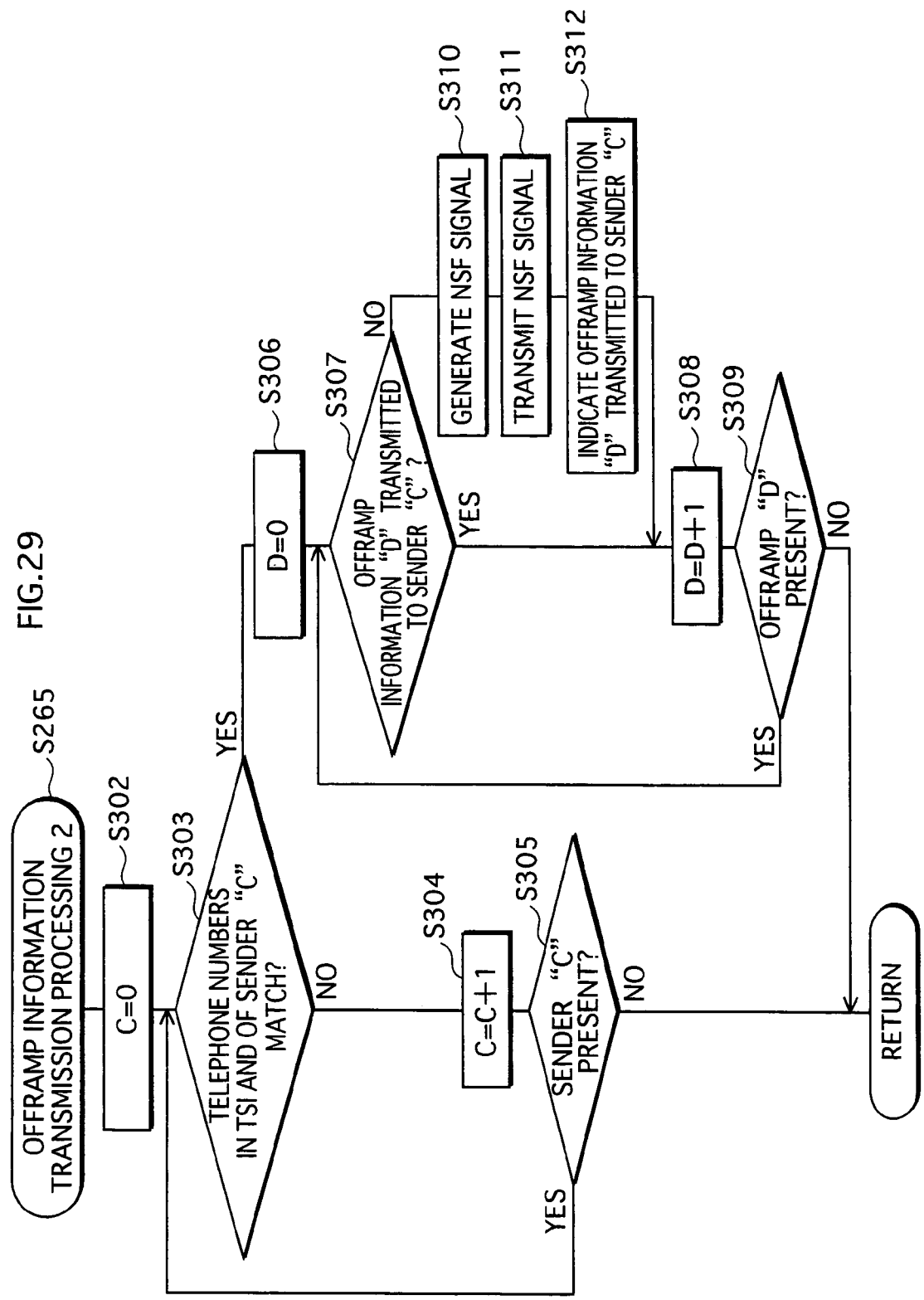
FIG. 29 is a flowchart showing a subroutine for offramp information transmission processing 2 performed by the controller of the first MFP.

FIG. 29 is a flowchart showing a subroutine for the offramp information transmission processing 2.

As illustrated in the figure, the controller 110 first sets a value of a variable C to "0" (step S302). Next, with reference to the sender information table 120, the controller 110 judges whether the telephone number of the sender corresponding to the sender number C="0" matches the telephone number temporarily stored in the above step S260 (the telephone number indicated by the received TSI signal) (step S303).

When judging that the two telephone numbers match (step S303: YES), the controller 110 sets the value of a variable D to "0" (step S306). Then, with reference to the offramp information transmission log table 121, the controller 110 judges whether offramp information of the offramp corresponding to the offramp number D has been transmitted to the FAX machine corresponding to the sender number C (step S307). In the example illustrated in FIG. 9, when C=0 and D=0, the value held in the cell in the column "0" and the row "0" is "1", which indicates that the transmission has been performed already.

When judging that the transmission has been performed already (step S307: YES), the controller 110 increments the current value of "0" of the variable D, so that D="1" (step S308), and judges whether there is an offramp corresponding to the offramp number "1" (step S309). This judgment is made by referring to the offramp information transmission log table 121 to check whether the offramp number column contains the value of D.

When judging that there is an offramp corresponding to the offramp number "1" (step S309: YES), the controller 110 goes back to the step S307 to judge whether the offramp information corresponding to the offramp number D, which takes on a value of "1" at this stage, has been transmitted to the FAX machine corresponding to the sender number C, which takes on a value of "0" at this stage.

When judging that the transmission has not yet been performed (step S307: NO), the controller 110 reads from the offramp information table 118, the telephone number of the offramp corresponding to the offramp number "1". Subsequently, the controller 110 generates an NSF (Non-Standard Facilities) signal composed of information showing that the signal contains an offramp telephone number as well as information showing that read telephone number in predetermined bit positions (step S310), and transmits the generated NSF signal (step S311).

Next, the controller 110 updates the offramp information transmission log table 121. To be more specific, the value held in the cell 1214 in the sender number column C ("0" in this example) and the offramp number row D ("1", in this example) is altered from "0" (Not Transmitted) to "1" (Transmitted) (step S312). The controller 110 then moves onto the step S308. This processing is identical to the step S300 described above.

The steps S307-S312 are repeated until it is judged in the step S309 that there is no offramp corresponding to the offramp number D. When judging that there is no such an offramp (step S309: NO), the controller 110 goes back to the subroutine for the FAX transmission/reception processing.

Through the above steps, it is ensured that the controller 110 transmits any offramp telephone number that has not yet been transmitted to the FAX machine currently in communication with, so that offramp information is more reliably transmitted to each FAX machine. In this respect, when performing the step S265, the controller 110 acts as a transmitting unit for transmitting an offramp telephone number serving as the address on the telephone network to a FAX machine.

On the other hand, when judging in the step S303 that the two telephone numbers do not match (step S303: NO), the controller 110 increments the current value "0" of the variable C, so that C="1" (step S304), and judges whether there is a Fax machine corresponding to the sender number "1" (step S305). This judgment is made by referring the sender information table 120 to check whether the sender number column contains the value of C.

When judging that there is no FAX machine corresponding to the sender number "1" (step S305: NO), the controller 110 goes back to the subroutine for the FAX transmission/reception processing. On the other hand, when judging that there is such a FAX machine (step S305: YES), the controller 110 goes back to the step S303 to repeat the steps following the step S303.

Referring back to FIG. 25, in the step S267, the controller 110 judges whether a DCS (Digital Command Signal) has been received. When judging that a DCS has not yet been received (step S267: NO), the controller 110 operates to receive other signals (step S270), and goes back to the step S258 illustrated in FIG. 24.

On the other hand, when judging that a DCS signal has been received (step S267: YES), the controller 110 further judges whether a password has been received (step S268). This judgment is made by referring to the value of the password flag set in the above step S264.

When judging that a password has been received, i.e. that the password flag is set to "1" (step S268: YES), the controller 110 performs sender information update processing (step S269), and then moves onto the step S272.

Figure 30:
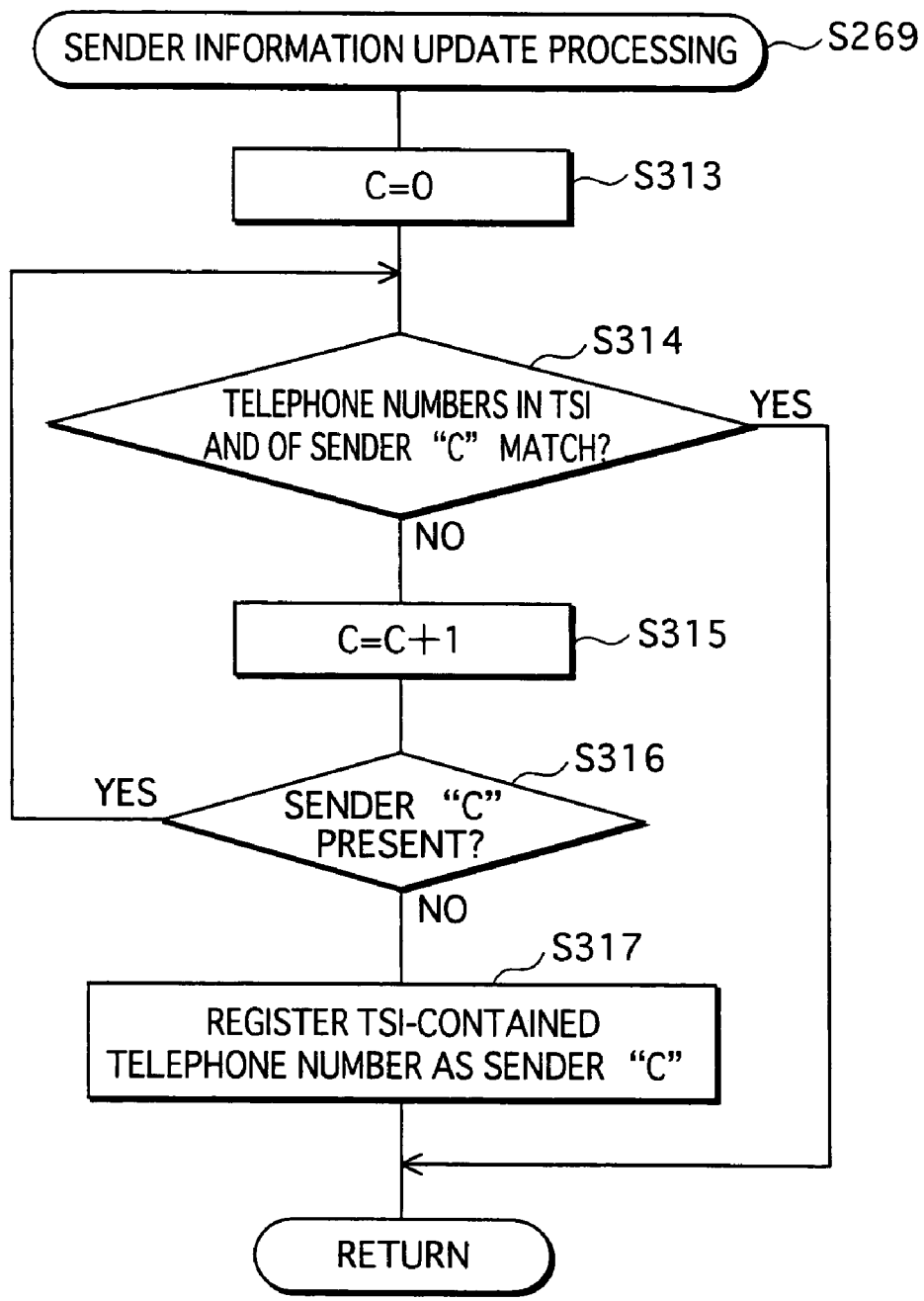
FIG. 30 is a flowchart illustrating a subroutine for sender information update processing performed by the controller of the first MFP.

FIG. 30 is a flowchart illustrating a subroutine for the sender information update processing.

As illustrated in the figure, the controller 110 first sets the value of a variable C to "0" (step S313).

Next, with reference to the sender information table 120, the controller 110 judges whether the telephone number of the sender identified by the sender number C="0" matches the telephone number temporarily stored in the above step S260 (the telephone number indicated by the received TSI signal) (step S314).

When judging that the two telephone numbers match (step S314: YES), the controller 110 erases the temporarily stored telephone number, and returns to the subroutine for the FAX transmission/reception processing.

On the other hand, when judging that the two telephone numbers do not match (step S314: NO), the controller 110 increments the variable C by "1" (step S315), and thus the variable C takes on the value "1" at this stage. The controller 110 then judges whether there is a FAX machine corresponding to the sender number "1" (step S316). This judgment is made by referring to the offramp information transmission log table 121 to check whether the sender number column contains the value of C.

When judging that there is such a FAX machine (step S316: YES), the controller 110 goes back to the step S314 to repeat the steps S314-S316.

On the other hand, when judging that there is no such a FAX machine (step S316: NO), the controller 110 additionally stores the temporarily stored telephone number as new sender information to the sender information table 120 (step S317). Subsequently, the controller 110 resets the password flag to "0" and erases the temporarily stored telephone number, and then goes back to the subroutine for the FAX transmission/reception processing. As described above, telephone numbers of FAX machines are stored to the sender information table 120 only when the FAX machines are authenticated as senders using an F-code password. This arrangement prevents the possibility that offramp information is transmitted to irrelevant FAX machines.

Referring back to FIG. 25, in the step S272, the controller 110 performs FAX reception processing based on DCS and other signals to receive image data from a sending Fax machine. Subsequently, the controller 110 performs a print job and other jobs as necessary based on the image data. The processing then returns to the main routine.

On the other hand, when judging that a password has not yet been received, i.e. the password flag remains "0" (step S268: NO), the controller 110 judges that the sender is an unauthorized FAX machine to which offramp information should not be transmitted, and thus forcefully disconnects the connection (step S271) and returns to the main routine. Note that the connection is disconnected also when the step S261 results in "NO", the step S262 results in "NO", and the step S267 results in "YES" after the iteration of the routine, because the step S268 still results in "NO".

7. Processing Performed by Fax Machines 60-80

Figure 31:
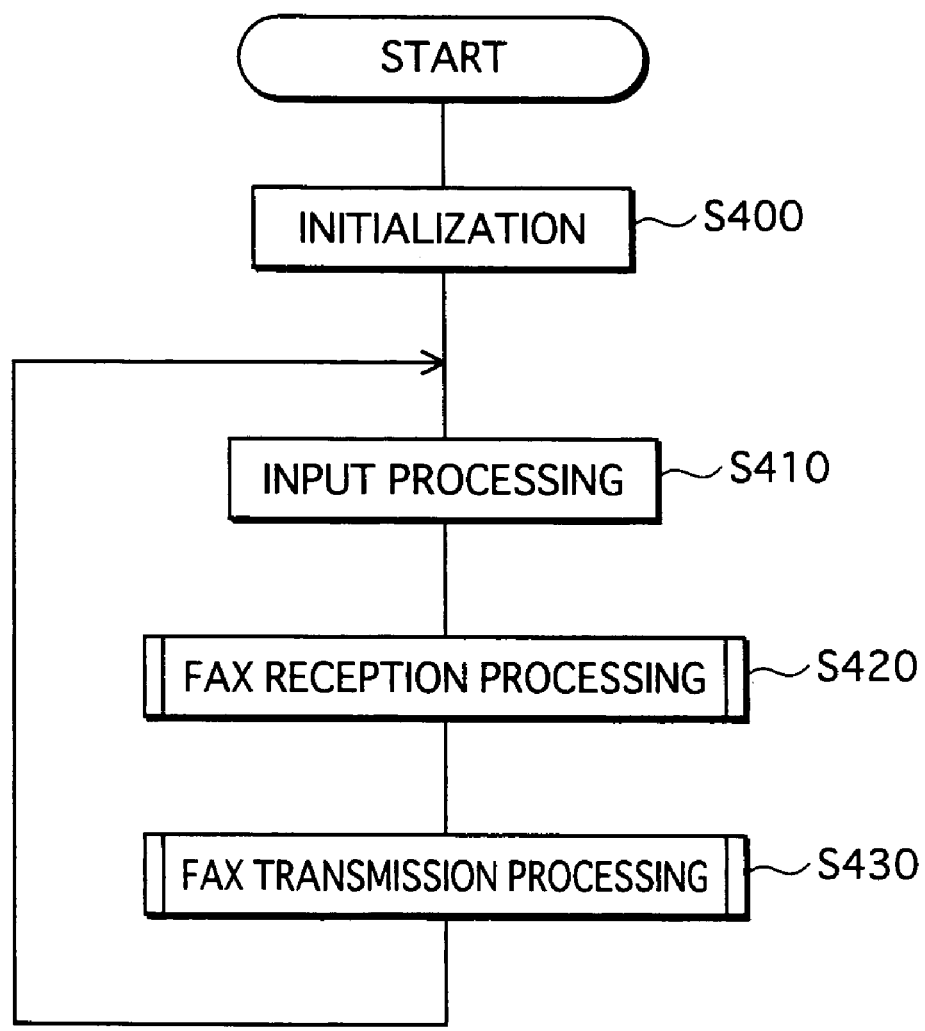
FIG. 31 is a flowchart illustrating a main routine of processing performed by a controller of the FAX machine.

FIG. 31 is a flowchart illustrating a main routine of processing performed by each of the FAX machines 60-80. As described above, since each FAX machine is capable of both FAX transmission and reception, the figure illustrates operations performed by a single FAX machine acting as a sending FAX machine and also as a receiving FAX machine. In practice, for example, when the FAX machine 60 is a sending end and the FAX machine 80 is a receiving end, the FAX reception processing in a step S420 is understood to be performed by the FAX machine 80, and the FAX transmission processing in a step S430 is understood to be performed by the FAX machine 60.

As illustrated in the figure, the FAX machine first performs initialization (step S400). The initialization is processing to clear the RAM 615, set various registers, and resets flags.

After the initialization, the FAX machine performs input processing (step S410) followed by the FAX reception processing (step S420) as a receiving FAX machine, and the FAX transmission processing (step S430) as a sending FAX machine.

Through the input processing (the step S410), the FAX machine receives input made by an operator using the operation panel 64. On receiving input of its own telephone number, the FAX machine stores the received telephone number to the self-related information memory unit 623.

Figure 32:
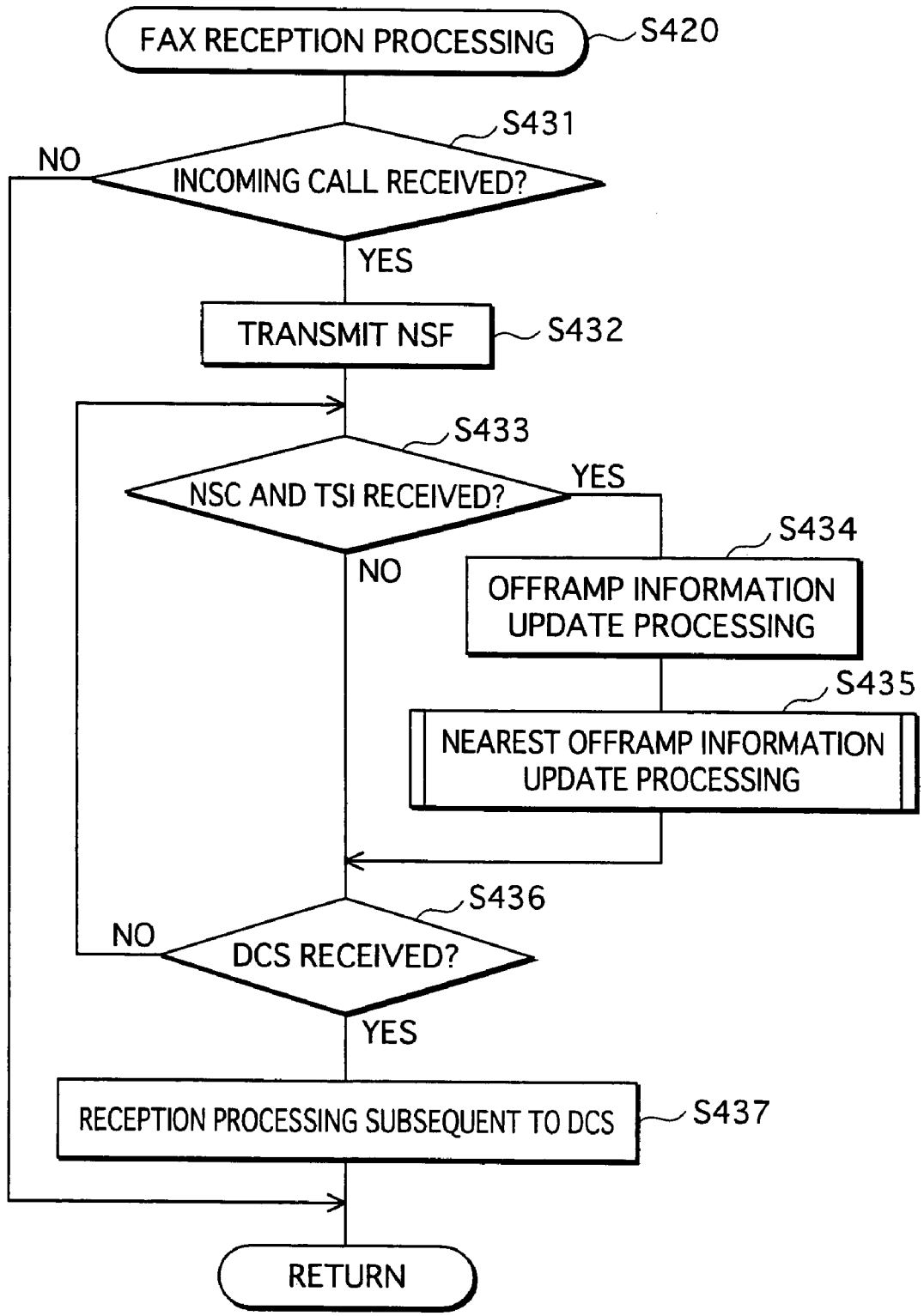
FIG. 32 is a flowchart illustrating a subroutine for FAX reception processing performed by the controller of the FAX machine.

FIG. 32 is a flowchart illustrating a subroutine for the FAX reception processing.

As illustrated in the figure, the FAX machine judges whether an incoming call is received (step S431). When judging that an incoming call is received (step S431: YES), the FAX machine reads from the offramp information table 622, the offramp telephone number corresponding to "1" in the nearest offramp column (i.e. the telephone number of the nearest offramp). The FAX machine then generates an NSF signal containing information of the read telephone number in a predetermined bit position, and transmits the generated NSF signal to a device at the other end of transmission (step S432). The NSF signal is transmitted during transmission and reception of other signals exchanged with the device at the other end according to the FAX transmission control procedures. In this respect, when performing the step S432, the controller of the FAX machine acts as a transmitting unit for transmitting an offramp telephone number serving as the address on the telephone network.

Suppose the device at the other end is a FAX machine, on receiving the NSF signal, the FAX machine as a sending end performs the later-described FAX transmission processing (step S430).

Following the NSF signal transmission, the FAX machine judges whether NSC and TSI signals have been received from the device at the other end (step S433). The signals are transmitted in the case where the device at the other end is, for example, an offramp (step S143).

When judging that NSC and TSI signals have been received (step S433: YES), the FAX machine performs the offramp information update processing (step S434). The processing performed herein is the same as the processing performed in the above step S238. That is, the FAX machine extracts from the received TSI signal, the telephone number of the device at the other end, and judges whether the extracted telephone number is already stored in the offramp information table 622. When judging that the telephone number is already stored, the FAX machine moves onto the step S435 to perform the nearest offramp information update processing. When it is judged, on the other hand, that the telephone number is not yet stored, it means that the telephone number is new offramp information. Thus, the FAX machine additionally stores the telephone number of that offramp to the offramp information table 622, and then moves onto the step S435. In this respect, when performing the step S433, the controller of the FAX machine acts as an address information acquiring unit for acquiring an offramp telephone number (address information) serving as the address on the telephone network. Further, when performing the step S434, the controller of the FAX machine acts as an address information storing unit for storing the acquired address information to the offramp information table 622 that serves as an address information memory.

Figure 33:
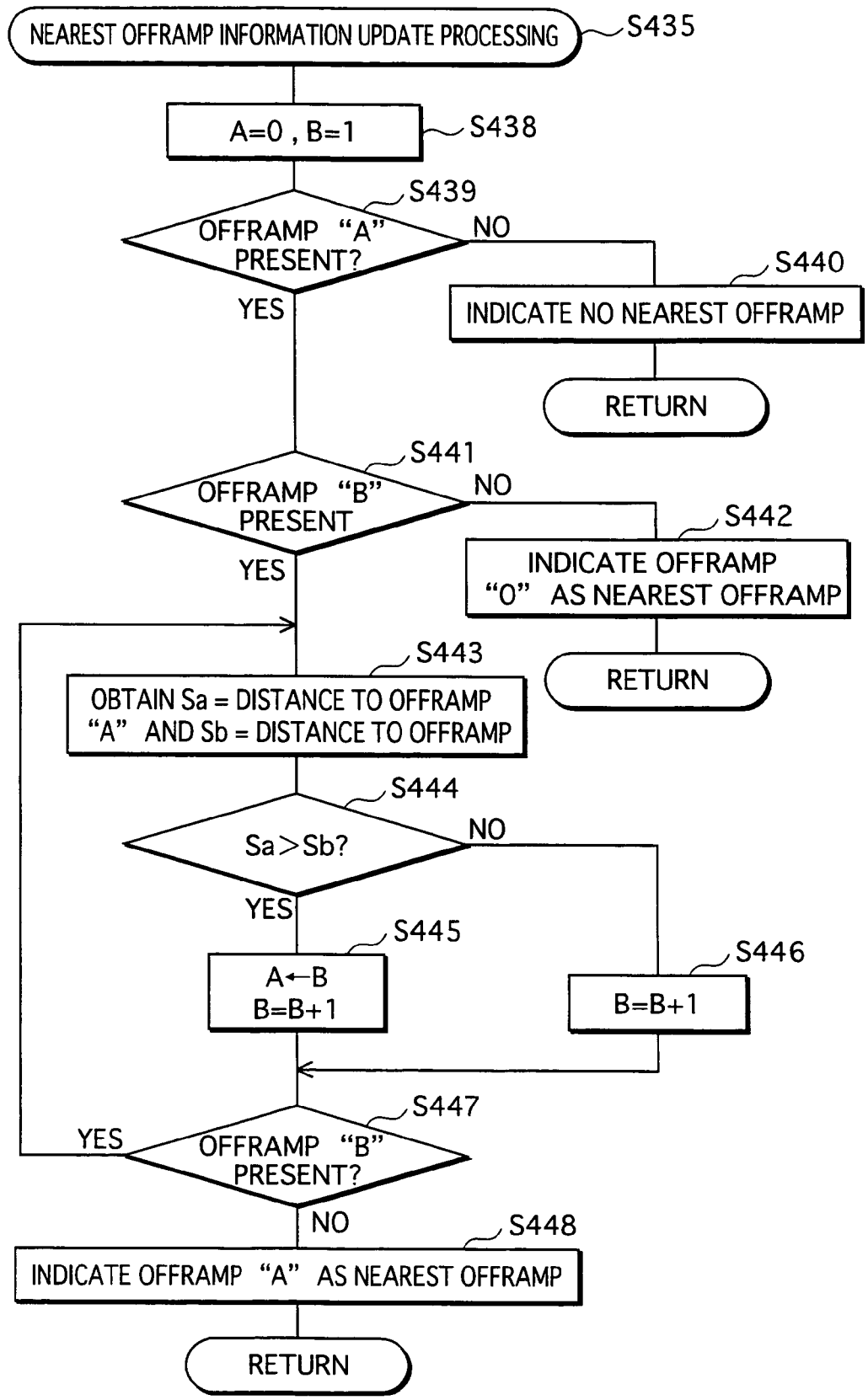
FIG. 33 is a flowchart illustrating a subroutine for nearest offramp information update processing performed by the controller of the FAX machine.

FIG. 33 is a flowchart illustrating a subroutine for the nearest offramp information update processing. Through the nearest offramp information update processing, the FAX machine selects an offramp that is located nearest out of all the offramps, and sets a flag "1" to indicate the selected offramp as the nearest one.

As illustrated in the figure, the controller of the FAX machine sets the variables A and B to "0" and "1", respectively (step S438).

Next, the controller of the FAX machine judges with reference to the offramp information table 622, whether there is an offramp corresponding to the offramp number A, which takes on a value "0" at this stage (step S439).

When judging that there is such an offramp (step S439: YES), the controller of the FAX machine judges whether there is an offramp number B, which takes on a value "1" at this stage (step S441).

When judging that there is such an offramp (step S441: YES), the controller of the FAX machine acquires a distance Sa to the offramp corresponding to the offramp number A and a distance Sb to the offramp corresponding to the offramp number B (step S443). There are various schemes known for acquiring the distances, so that description thereof is not given in detail. Briefly speaking, one scheme uses a table prepared in advance to show area codes of telephone numbers each along with approximate distances to other area codes. The controller of the FAX machine reads from the table, a distance between the area code of its own telephone number and each area code of the telephone numbers of the offramps A and B.

In the case where Sa>Sb (step S444: YES), the controller of the FAX machine alters the value of A to the value of B, and then increment the value of B by "1" (step S445), and moves onto a step S447. In the above example, the new values of A and B are "1" and "2", respectively.

On the other hand, when not Sa>Sb, i.e. Sa☐Sb (step S444: NO), the controller of the FAX machine increments the value of B by "1" (step S446), and moves onto the step S447. In the above example, the value of A remains "0", while the value of B is incremented to "2".

Next, with reference to the offramp information table 622, the controller of the FAX machine judges whether there is an offramp corresponding to the offramp number B (step S447). When judging that there is an offramp corresponding to the offramp number B, which takes on a value "2" at this stage (step S447: YES), the controller of the FAX machine goes back to the step S443 to repeat the steps S443-S447 until it is judged in the step S447 that there is no offramp corresponding to the offramp number B. Through the above steps, the number of an offramp judged to be nearest to the FAX machine remains as the value of A without being incremented (step S446). That is to say, the nearest offramp is the one corresponding to the value of A held at the time when it is judged in the step S447 that there is no offramp corresponding to the offramp number B.

When judging that there is no offramp corresponding to the offramp number B (step S447: NO), the offramp corresponding to the offramp number A at the time is determined as the nearest offramp. Accordingly, the controller of the FAX machine sets a corresponding flag "1" in the nearest offramp column of the offramp information table 622 (step S448). At this time, in the case where there is any other flag set to "1" in the nearest offramp column, the controller of the FAX machine resets such a flag to "0".

When judging in the step S439 that there is no such an offramp, the controller of the FAX machine recognizes that the offramp information table 622 contains no offramp information at all. Thus, the controller of the FAX machine moves onto the step S440 to indicate that there is no nearest offramp, and goes back to the subroutine for the FAX reception processing.

Further, when judging in the step S441 that there is no such an offramp, the controller of the FAX machine moves on to a step S442 to indicate that the offramp corresponding to the offramp number A="0" as the nearest offramp. Thus, the controller of the FAX machine sets a corresponding flag "1" in the nearest offramp column of the offramp information table 622, and goes back to the subroutine for the FAX reception.

Referring back to FIG. 32, in the step S436, the controller of the FAX machine judges whether a DCS signal has been received from the device at the other end.

When judging that no DCS signal has been received (step S436: NO), the controller of the FAX machine goes back to the step S433 to repeat the steps S433-S435.

On the other hand, when judging that a DCS signal has been received (step S436: YES), the controller of the FAX machine performs the FAX reception processing based on the DCS signal and other signals to receive FAX data from the device at the other end, and then performs a print job and other jobs as necessary based on the image data (step S437). The processing then returns to the main routine.

Figure 34:
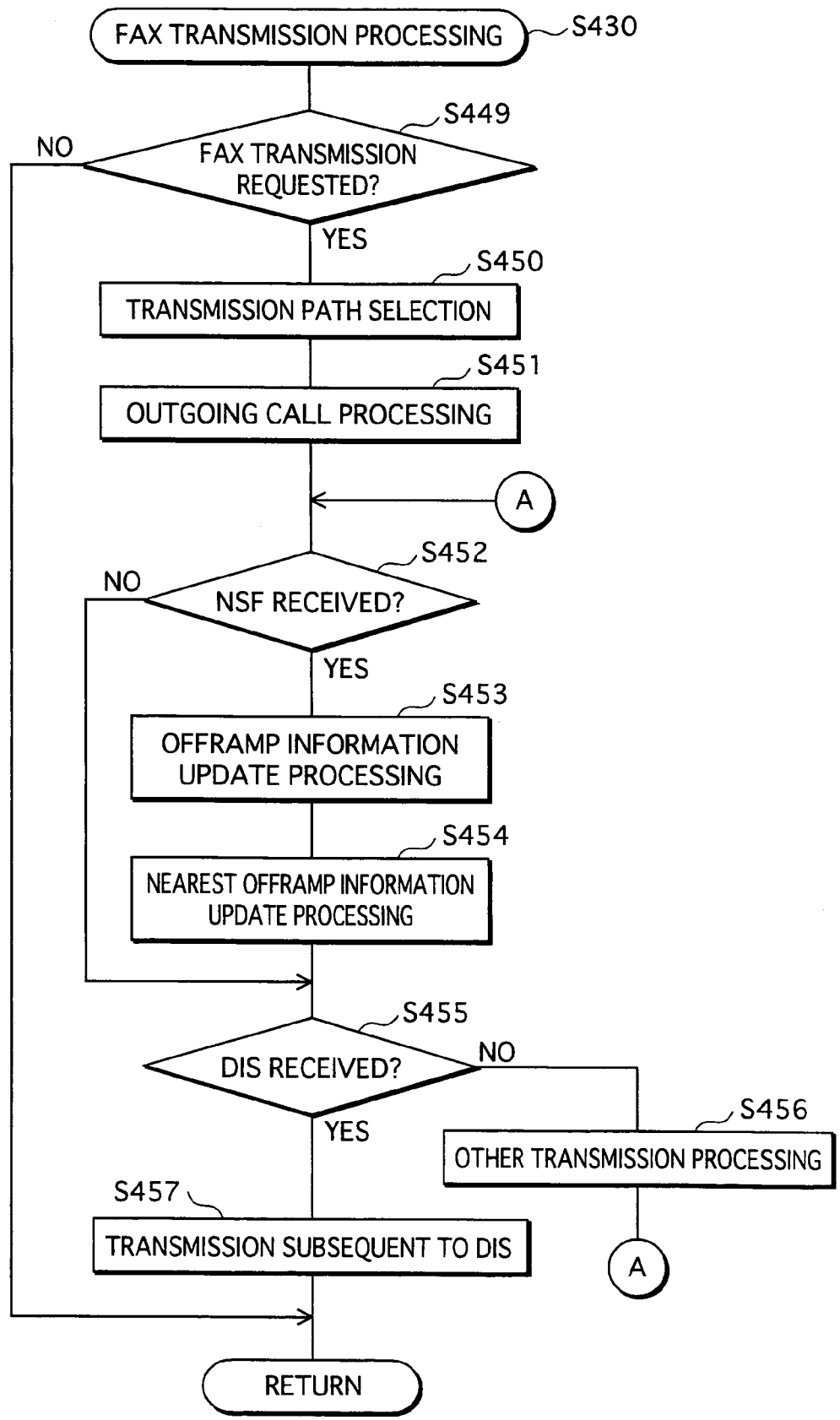
FIG. 34 is a flowchart illustrating a subroutine for FAX transmission processing performed by the controller of the FAX machine.

FIG. 34 is a flowchart illustrating a subroutine for the FAX transmission processing.

As illustrated in the figure, the controller of the FAX machine first judges whether a transmission request has been made (step S449). Here, for example, a transmission request is regarded to be made at a push of a FAX transmission start key under the sate where a document is set in the scanner 62 and the telephone number of the receiving FAX machine has been designated.

When judging that a transmission request is made (step S449: YES), the FAX machine starts to scan image of the document, and performs the transmission path selection processing based on the designated telephone number of the receiving FAX machine (step S450). The transmission path selection processing is performed using the known technique mentioned above. Here, it should be noted that the telephone number of a selectable onramp is read from the onramp information table 621 and the telephone numbers of selectable offramps are read from the offramp information table 622, and the read telephone numbers are used in the transmission path selection.

Next, the controller of the FAX machine issues an outgoing call (step S451). In the case where a transmission only over the public network 20 is selected, the outgoing call is issued directly to the receiving FAX machine. In the case where Internet FAX transmission is selected, the outgoing call is issued to a selected onramp, which in this example is the MFP 100.

After connection with a device at the other end (i.e. the MFP 100 or the receiving FAX machine) is established, the controller of the FAX machine judges whether an NSF signal has been received from the device (step S452). The NSF signal may be the one transmitted in the step S311 or S432. When judging that an NSF signal is received (step S452: YES), the controller of the FAX machine performs the offramp information update processing (step S453).

The offramp information update processing is similar to the one performed in the above step S434. To be more specific, the controller of the FAX machine extracts an offramp telephone number from the received NSF signal, and judges whether the extracted telephone number is already stored in the offramp information table 622. When judging that the telephone number is already stored, the controller of the FAX machine moves onto the nearest offramp information update processing (step S454). On the other hand, when it is judged that the telephone number is not yet stored, it means the telephone number is new offramp information. Thus, the controller of the FAX machine additionally stores the telephone number to the offramp information table 622, and then moves onto the step S454.

In the step S454, the controller of the FAX machine performs the nearest offramp information update processing. This processing is substantially the same as the one performed in the above step S435, and thus no description is given here.

On the other hand, when judging that no NSF signal has been received (step S452: NO), the controller of the FAX machine moves onto the step S455.

In the step S455, the controller of the FAX machine judges whether a DIS (Digital Identification Signal) has been received from the device at the other end (step S455).

When judging that no DIS has been received (step S455: NO), the controller of the FAX machine performs transmission and reception of other signals, which are well-known in the art (step S456), and goes back to the step S452 to repeat the steps S452-S455.

On the other hand, when judging that a DIS has been received (step S455: YES), the controller of the FAX machine performs FAX transmission according to the received DIS and other signals, so that FAX data is transmitted to the device at the other end (step S457). The processing then returns to the main routine.

As described above, in the system 1 according to the present embodiment, when its own offramp information (an address and a telephone number) is inputted thereto, each offramp supplies the offramp information to an onramp.

On receiving (acquiring) offramp information, each onramp stores therein the offramp information, and supplies the offramp information to other onramps and FAX machines. Further, on receiving offramp information from another onramp, each onramp stores therein the received offramp information, and supplies the offramp information to other onramps. Consequently, each onramp can use the offramp information in the transmission path selection. Further, on receiving (acquiring) offramp information, a FAX machine stores and uses the received offramp information in the transmission path selection. In other words, the system 1 according to the present embodiment is so structured that offramp information is sequentially supplied to each onramp and FAX machine.

Consequently, even when a new offramp is added to the system 1, it is not necessary for administrators of the onramps and FAX machines in the system to go through a troublesome operation of manually inputting offramp information of the new offramp. Further, it is not necessary for the administrators to monitor when and where a new offramp will be added to the system. As a result, the system 1 provides great deal of convenience to the administrators.

Further, on receiving input of offramp information from an operator, an onramp stores therein the received onramp information, and transmits the offramp information to other onramps and FAX machines. In other words, when one operator inputs offramp information to one onramp, the offramp information is sequentially transmitted to all the other onramps as well as to all the FAX machines.

With this arrangement, in view of the administrators of the other onramps and the FAX machines, there is no need to input the offramp information to the onramps that they administer.

Further, on receiving input of onramp information (address) of another onramp from an operator, each onramp stores therein the received onramp information, and supplies the onramp information to other onramps. On receiving onramp information from another onramp, each onramp stores therein the received onramp information, and supplies the onramp information to other onramps. In other words, when one operator inputs onramp information to one onramp, the onramp information is sequentially transmitted to all the other onramps.

Consequently, in view of the administrators of the other onramps, there is no need to input the onramp information to the onramps that they administer.

Further, in the system 1, each FAX machine acquires, during communication with an offramp, the telephone number of that offramp and stores therein the acquired telephone number. Each time offramp telephone number is acquired, the FAX machine judges using the acquired telephone numbers, which offramp is the nearest one thereto. At the time of FAX transmission with another FAX machine, the FAX machine informs the telephone number of the nearest offramp. With this arrangement, each FAX machine can receive an offramp telephone number from a FAX machine at the other end. Thus, it is not necessary for administrators of the FAX machines to input information of the nearest offramp by themselves, which is convenient for the administrators.

The present invention may be embodied not only as the specific system, onramp, offramp, and FAX machine described above, but also as any method described above. Further, the present invention may be embodied as a program run by a computer to perform the method.

When embodying the present invention as a program, the program may be stored in a various types of computer-readable recording medium. Examples of such a recording medium include a magnetic tape, a magnetic disk such as a flexible disk, an optical medium such as a DVD, a CD-ROM, a CD-R, an MO and a PD, and a flashmemory such as Smart Media (Registered Trademark) Still further, the present invention may be manufactured or transferred in form of such a recording medium, and transmitted and provided in form of a program via a various types of wired or wireless network, such as the Internet, broadcast, an electronic communication network, and satellite communications.

Modifications

Up to this point, the present invention has been described by way of the above embodiment. However, it is naturally appreciated that the present invention is not limited to the specific embodiment described above, and various modifications including the following may be made.

(1) According to the above embodiment, offramp information includes the telephone number of an offramp, and the telephone number is used as information for estimating the transmission charge. Yet, to perform the transmission path selection, it is sufficient that an approximate location of each offramp is known. On this account, the offramp information is not limited to a telephone number, and may be location information showing for example the latitude and longitude of each offramp. In this case, each offramp acquires the latitude and longitude and other information specifying its own location using, for example, GPS (Global Positioning System), and generates offramp information that contains the thus acquired location information as well as the domain name serving as its own address. Here, each onramp is provided in advance with a table showing, for each major city and town, the latitude and longitude along with the telephone number area code. This enables the onramps to know an area code of each offramp based on the latitude and longitude. In this respect, the latitude and longitude of an offramp serves as information used to acquire a telephone number area code (an address on the telephone network) of the offramp.

(2) According to the above embodiment, offramp information is supplied to one onramp using an offramp information mail F. Yet, it is applicable to supply the offramp information to two more onramps at a time.

(3) According to the above embodiment, the system 1 includes, as onramps, two MFPs 100 and 200 that are identical in functionality. Yet, it is possible that the system additionally includes one or more FAX gateways, other than an MFP, having an onramp function (a relay function of forwarding FAX data received over a telephone network to the Internet) without other functions. In such a system, offramp information is transmitted to each non-MFP FAX gateway always via the MFP 100.

(4) According to the above embodiment, each MFP has either an onramp function or offramp function. Yet, according to one aspect of the present invention, each MFP may have both onramp and offramp functions. In this case, when an MFP acts as an onramp, the MFP performs the steps of the main routine illustrated in FIG. 18. When an MFP acts as an offramp, on the other hand, the MFP performs the steps of the main routine illustrated in FIG. 13.

(5) Further, the present invention is applicable to any FAX gateway including, for example, a copier and a FAX machine as long as the FAX gateway has an onramp function and/or offramp function. Further, a PC (Personal Computer) into which a program for performing the above processing is installed may act as a FAX gateway.

(6) A FAX machine according to the present invention is not limited to a G3 FAX machine. As long as being capable of communication according to the facsimile transmission control procedures in compliance with G-standard as defined by the ITU-T recommendation, any FAX machine including a G4 FAX machine may be applicable. When a FAX machine at the other is a G4 FAX machine, an MFP as a FAX gateway performs FAX transmission according to the G4 facsimile transmission procedures.

(7) Further, in the above embodiment, transmission between an onramp and an offramp is performed over a LAN and the Internet, which is lower in transmission charge than a telephone network. Yet, the present invention is not limited to this specific example. For example, a WAN or a flat-pricing dedicated line may be employed as a communication network other than the telephone network. In such a case, each onramp and offramp may be a FAX gateway capable of mutually connecting the communication network and the telephone network, FAX transmission/reception with a FAX machine over the telephone network, and transmission/reception of FAX data, offramp information, and onramp information over the communication network.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. In a FAX transmission system composed of a plurality of first FAX gateways having a first function of receiving FAX data from a sending FAX machine over a telephone network and forwarding the FAX data over a communication network other than the telephone network, and a plurality of second FAX gateways having a second function of receiving FAX data over the communication network and forwarding the FAX data to a receiving FAX machine over the telephone network, at least one of the first FAX gateways having the first function comprises:

a device information acquiring unit operable to acquire, for each second FAX gateway having the second function, device information that includes (i) an address of that second FAX gateway on the communication network and (ii) an address of that second FAX gateway on the telephone network or information for acquiring the telephone network address;

a device information memory;

a device information storing unit operable to store the acquired device information to the device information memory;

a forwarding unit operable to select one of the second FAX gateways having the second function as a forward destination based on the device information, and forward the FAX data to the selected forward destination;

a device information transmitting unit operable to transmit the device information to at least one other of the first FAX gateways having the first function; and a judging unit operable, before the device information storing unit stores the acquired device information, to judge whether the device information is already stored in the device information memory, wherein the device information transmitting unit performs the transmission when the judging unit judges the device information is not yet stored.

2. The at least one first FAX gateway having the first function according to claim 1, wherein the device information acquiring unit acquires the device information from another first FAX gateway.

3. The at least one first FAX gateway having the first function according to claim 1, wherein the FAX transmission system includes at least three first FAX gateways having the first function in total, the at least one first FAX gateway having the first function further comprising:

a recipient information acquiring unit operable to acquire an address of one other of the first FAX gateways having the first function on the communication network;

a recipient information memory;

a recipient information storing unit operable to store the address acquired by the recipient information acquiring unit to the recipient information memory; and a recipient information transmitting unit operable to transmit the address acquired by the recipient information acquiring unit to yet one other of the other first FAX gateways having the first function.

4. The at least one first FAX gateway having the first function according to claim 1, wherein the FAX transmission system further includes one other first FAX gateway, and the device information transmitting unit transmits the device information to said one other first FAX gateway.

5. The at least one first FAX gateway having the first function according to claim 1, wherein the forwarding unit selects, as the forward destination, one of the second FAX gateways having the second function via which the FAX data is transmitted to the receiving FAX machine most advantageously in a transmission charge.

6. The at least one first FAX gateway having the first function according to claim 1, wherein the communication network is the Internet, the address on the communication network is an Internet address, the address on the telephone network is a telephone number or an area code of the telephone number, the device information acquiring unit acquires the device information via an Internet mail, and the device information transmitting unit transmits the device information via an Internet mail.

7. The at least one first FAX gateway having the first function according to claim 1, further comprising a receiving unit operable to receive user input of the device information, wherein the device information acquiring unit acquires the user input received by the receiving unit as the device information.

8. The at least one first FAX gateway having the first function according to claim 1, wherein the device transmitting unit also is operable to transmit the information of the address of a second FAX gateway having the second function on the telephone network, or for acquiring the telephone network address, to the sending FAX machine.

9. The at least one first FAX gateway having the first function according to claim 8, wherein the device transmitting unit transmits the information while in communication with the sending FAX machine, the communication being performed in response to a call issued from the sending FAX machine.

10. The at least one first FAX gateway having the first function according to claim 8, wherein the device transmitting unit issues a call to the sending FAX machine and transmits the information while in communication with the sending FAX machine.

11. The at least one first FAX gateway having the first function according to claim 8, wherein the communication network is the Internet, and the device information acquiring unit acquires the information from the second FAX gateways having the second function via an Internet mail.

12. The at least one first FAX gateway having the first function according to claim 8, further comprising a receiving unit operable to receive user input of the information, wherein the device information acquiring unit acquires the user input received by the receiving unit as the information.

13. A FAX transmission system comprising:

a first and a second FAX gateway each having a function of receiving FAX data from a sending FAX machine over a telephone network and forwarding the FAX data over a communication network other than the telephone network; and a plurality of third FAX gateways having a function of receiving FAX data over the communication network and forwarding the FAX data to a receiving FAX machine over the telephone network, wherein each of the third FAX gateways includes a first transmitting unit operable to transmit device information to the first FAX gateway, the device information including (i) an address of its own third FAX gateway on the communication network and (ii) an address of its own third FAX gateway on the telephone network or information for acquiring the telephone network addresses, the first FAX gateway includes a first receiving unit operable to receive the device information from the third FAX gateways, a first memory, a first storing unit operable to store the received device information to the first memory, a forwarding unit operable to select one of the third FAX gateways as a forward destination based on the device information, and forward the FAX data to the selected forward destination, a second transmitting unit-operable to transmit the device information to the second FAX gateway, and a judging unit operable, before the first storing unit stores the acquired device information, to judge whether the device information is already stored in the first memory, the second transmitting unit performing the transmission when the judging unit judges the device information is not yet stored, and the second FAX gateway includes a second receiving unit operable to receive the device information from the first FAX gateway, a second memory, and a second storing unit operable to store the received device information to the second memory.

* * * * *